(12) United States Patent
Nagelsdiek et al.

(10) Patent No.: US 9,556,299 B2
(45) Date of Patent: Jan. 31, 2017

(54) SURFACE-ACTIVE COMB COPOLYMERS

(75) Inventors: Renë Nagelsdiek, Hamminkeln (DE); Bernd Göbelt, Wesel (DE); Dorothée Greefrath, Mülheim an der Ruhr (DE); Bärbel Gertzen, Emmerich (DE); Jürgen Omeis, Dorsten-Lembeck (DE)

(73) Assignee: BYK-Chemie GmbH, Wesel (DE)

( * ) Notice: Subject to any disclaimer, the term of this patent is extended or adjusted under 35 U.S.C. 154(b) by 245 days.

(21) Appl. No.: 14/127,811

(22) PCT Filed: May 4, 2012

(86) PCT No.: PCT/EP2012/001931
§ 371 (c)(1),
(2), (4) Date: Nov. 20, 2014

(87) PCT Pub. No.: WO2012/175158
PCT Pub. Date: Dec. 27, 2012

(65) Prior Publication Data
US 2015/0203619 A1    Jul. 23, 2015

(30) Foreign Application Priority Data
Jun. 22, 2011 (EP) .................................. 11005094

(51) Int. Cl.
| C08F 8/14 | (2006.01) |
|---|---|
| C08F 222/06 | (2006.01) |
| C08F 222/08 | (2006.01) |
| C08F 8/32 | (2006.01) |
| C08F 299/00 | (2006.01) |
| C08K 3/04 | (2006.01) |
| C08K 7/24 | (2006.01) |
| C08L 31/02 | (2006.01) |
| C08L 35/06 | (2006.01) |
| C08L 47/00 | (2006.01) |
| C08G 81/02 | (2006.01) |
| C08F 210/10 | (2006.01) |
| C08F 36/08 | (2006.01) |
| C08F 136/06 | (2006.01) |
| C08F 136/08 | (2006.01) |
| C08F 36/06 | (2006.01) |
| C08F 236/06 | (2006.01) |
| C08G 81/00 | (2006.01) |
| C08F 110/10 | (2006.01) |
| C08F 236/08 | (2006.01) |
| C08F 10/10 | (2006.01) |

(52) U.S. Cl.
CPC ............. *C08F 222/08* (2013.01); *C08F 8/32* (2013.01); *C08F 299/00* (2013.01); *C08G 81/021* (2013.01); *C08K 3/04* (2013.01); *C08K 7/24* (2013.01); *C08L 31/02* (2013.01); *C08L 35/06* (2013.01); *C08L 47/00* (2013.01); *C08F 8/14* (2013.01); *C08F 10/10* (2013.01); *C08F 36/06* (2013.01); *C08F 36/08* (2013.01); *C08F 110/10* (2013.01); *C08F 136/06* (2013.01); *C08F 136/08* (2013.01); *C08F 210/10* (2013.01); *C08F 222/06* (2013.01); *C08F 236/06* (2013.01); *C08F 236/08* (2013.01); *C08F 2500/09* (2013.01); *C08F 2810/00* (2013.01); *C08F 2810/30* (2013.01); *C08F 2810/40* (2013.01); *C08F 2810/50* (2013.01); *C08G 81/00* (2013.01); *C08G 81/022* (2013.01); *C08L 2205/03* (2013.01)

(58) Field of Classification Search
None
See application file for complete search history.

(56) References Cited

U.S. PATENT DOCUMENTS

| 2,977,334 | A | * | 3/1961 | Zopf, Jr. ................... C08F 8/00 524/531 |
|---|---|---|---|---|
| 2,992,987 | A | * | 7/1961 | Fields ..................... C08L 33/06 508/468 |
| 3,684,776 | A | * | 8/1972 | Field ......................... C08F 8/00 424/73 |
| 6,071,862 | A | * | 6/2000 | Shanklin, Jr. ........ C10M 159/12 508/222 |
| 6,075,093 | A | * | 6/2000 | Rodrigues ............. C08F 257/02 252/8.62 |
| 6,084,030 | A | | 7/2000 | Janssen et al. |
| 6,153,705 | A | | 11/2000 | Corpart et al. |
| 6,211,299 | B1 | | 4/2001 | Moss, III et al. |
| 6,291,620 | B1 | | 9/2001 | Moad et al. |
| 6,544,935 | B1 | * | 4/2003 | Vargo ....................... C08F 8/32 508/232 |

(Continued)

FOREIGN PATENT DOCUMENTS

| EP | 0 945 473 A1 | 9/1999 |
|---|---|---|
| EP | 0 945 501 A1 | 9/1999 |

(Continued)

OTHER PUBLICATIONS

PCT/EP2012/001931—International Search Report, Jun. 5, 2012.
(Continued)

*Primary Examiner* — Richard A Huhn
(74) *Attorney, Agent, or Firm* — Curatolo Sidoti Co., LPA; Joseph G. Curatolo; Salvatore A. Sidoti

(57) ABSTRACT

The invention relates to a copolymer whose overall structure as such and/or an optionally present segment A having at least 10 bivalent structural units in the overall structure contains surface-active bivalent structural units present in the form of long hydrocarbon chains among other forms. The copolymer is effective as a universal surface-active additive, especially also in conjunction with nonpolar media.

19 Claims, No Drawings

(56) References Cited

U.S. PATENT DOCUMENTS

| | | | |
|---|---|---|---|
| 6,642,301 | B2 | 11/2003 | White et al. |
| 6,747,097 | B2 * | 6/2004 | Chao .................... C08G 18/10 525/232 |
| 6,747,111 | B2 | 6/2004 | Chiefari et al. |
| 6,846,882 | B2 | 1/2005 | Kroner et al. |
| 6,875,897 | B1 | 4/2005 | Lange et al. |
| 6,914,163 | B2 | 7/2005 | Lange et al. |
| 7,034,085 | B2 | 4/2006 | Mestach et al. |
| 7,078,464 | B2 | 7/2006 | Schmidhauser et al. |
| 7,291,681 | B2 | 11/2007 | Rath et al. |
| 7,714,075 | B1 | 5/2010 | Le et al. |
| 7,851,515 | B2 | 12/2010 | Salz et al. |
| 7,988,749 | B2 | 8/2011 | Lange et al. |
| 8,168,574 | B2 | 5/2012 | Visger et al. |
| 8,496,716 | B2 | 7/2013 | Lange et al. |
| 2004/0143035 | A1 | 7/2004 | Goebelt et al. |
| 2011/0190182 | A1 * | 8/2011 | Price ....................... C08F 8/14 508/507 |

FOREIGN PATENT DOCUMENTS

| | | |
|---|---|---|
| EP | 1 416 019 B1 | 5/2004 |
| JP | H11-510840 A | 9/1999 |
| JP | H11-310795 A | 11/1999 |
| JP | 2003-528947 A | 9/2003 |
| JP | 2006-063167 A | 3/2006 |
| WO | WO 98/01478 | 1/1998 |
| WO | WO 98/58974 | 12/1998 |
| WO | WO 99/31144 | 6/1999 |
| WO | WO 01/44389 A1 | 6/2001 |
| WO | WO 2005/103093 A2 | 11/2005 |
| WO | WO 2010/014655 A1 | 2/2010 |

OTHER PUBLICATIONS

PCT/EP2012/001931—Written Opinion of the International Searching Authority, Jun. 5, 2012.

PCT/EP2012/001931—International Preliminary Report on Patentability, May 29, 2013.

Krzysztof Matyjaszewski, et al., "Atom Transfer Radical Polymerization", Chem. Rev., Sep. 12, 2001, vol. 101, pp. 2921-2990, American Chemical Society.

Sang Beom Lee, et al., "ATRP Synthesis of Amphiphilic Random, Gradient, and Block Copolymers of 2-(Dimethylamino)ethyl Methacrylate and n-Butyl Methacrylate in Aqueous Media", Biomacromolecules, Jul. 9, 2003, vol. 4, pp. 1386-1393, American Chemical Society.

Atsushi Goto, et al., "Living Radical Polymerization with Nitrogen Catalyst: Reversible Chain Transfer Catalyzed Polymerization with N-Iodosuccinimide", Macromolecules, Aug. 16, 2008, vol. 41, No. 17, American Chemical Society.

Alexei A. Gridnev, et al., "Catalytic Chain Transfer in Free-Radical Polymerizations", Chem. Rev., Nov. 15, 2001, vol. 101, pp. 3611-3659, American Chemical Society.

Ghislain David, et al., "Use of Iodocompounds in Radical Polymerization", Chem Rev., Aug. 24, 2006, vol. 106, pp. 3936-3962, American Chemical Society.

A. Goto, et al., "Reversible Chain Transfer Catalyzed Polymerization (RTCP): A New Class of Living Radical Polymerization", Polymer, Nov. 10, 2008, vol. 49, Issue 24, pp. 5177-5185, Elsevier Science.

Nocolay V. Tsarevsky, et al., "Green' Atom Transfer Radical Polymerization: From Process Design to Preparation of Well-Defined Environmentally Friendly Polymeric Materials", Chem. Rev., May 27, 2007, vol. 107, pp. 2270-2299, American Chemical Society.

Alexei Gridnev, "The 25th Anniversay of Catalytic Chain Transfer", Journal of Polymer Science: Part A: Polymer Chemistry, 2000, vol. 38, pp. 1753-1766, John Wiley & Sons, Inc.

Craig J. Hawker, et al., "New Polymer Synthesis by Nitroxide Mediated Living Radical Polymerizations", Chem. Rev., Oct. 25, 2001, vol. 101, pp. 3661-3688, American Chemical Society.

Wojciech Jakubowski, et al., "Comparison of Thermomechanical Properties of Statistical, Gradient and Block Copolymers of Isobornyl Acrylate and n-butyl Acrylate with Various Arcylate Homopolymers", Polymer, Jan. 29, 2008, vol. 49, pp. 1567-1578, Elsevier.

Thomas Junkers, et al., "Thioketone-Mediated Polymerization of Butyl Acrylate: Controlling Free-Radical Polymerization via a Dormant Radical Species*", Macromol. Rapid Commun., 2007, vol. 28, pp. 746-753, Wiley-Vch Verlag GmbH & Co., Germany.

Emmanuel Mignard, et al., "Online Monitoring of Controlled Radical Polymerization: Nitroxide-Mediated Gradient Copolymerization", Macromolecules, Jan. 8, 2004, vol. 37, pp. 966-975, American Chemical Society.

Andrew Ah Toy, et al., "Thioketone Spin Traps as Mediating Agents for Free Radical Polymerization Process", Chem. Commun., Jan. 20, 2006, pp. 835-837, The Royal Society of Chemistry.

Shigeru Yamago, "Precision Polymer Synthesis by Degenerative Transfer Controlled/Living Radical Polymerization Using Organotellurium, Organostibine, and Organobismuthine Chain-Transfer Agents", Chem. Rev., Aug. 28, 2009, vol. 109, pp. 5051-5078, American Chemical Society.

Makoto Ouchi, et al., "Transition Metal-Catalyzed Living Radical Polymerization: Toward Perfection in Catalysis and Precision Polymer Synthesis", Chem. Rev., Sep. 29, 2009, vol. 109, pp. 4963-5050, American Chemical Society.

Bradford B. Wayland, et al., "Degenerative Transfer and Reversible Termination Mechanisms for Living Radical Polymerizations Mediated by Cobalt Porphyrins", Macromolecules, Oct. 27, 2006, vol. 39, pp. 8219-8222, American Chemical Society.

Philipp C. Wieland, et al., "A New Additive for Controlled Radical Polymerization", Macromol. Rapid Commun., 2001, vol. 22, No. 9, pp. 700-703, Wiley-Vch Verlag GmbH, Germany.

Per B. Zetterlund, et al., "Addition-Fragmentation Chain Transfer Involving Dimers of α-Methylvinyl Monomers Studied by ESR Spectroscopy: Competition between Fragmentation and Bimolecular Termination", Macromol. Rapid Commun., 2003, vol. 24, No. 2, pp. 197-201, Wiley-Vch Verlag GmbH, Germany.

Yasumasa Watanabe, et al., "Addition-Fragmentation Chain Transfer in Free Radical Polymerization in the Presence of 2,4-Diphenyl-4-methyl-1-pentene", Chemistry Letters, 1993, vol. 22, No. 7, pp. 1089-1092, The Chemical Society of Japan. (Abstract).

Hitoshi Tanaka, et al., "Polymerization Reactivity of Unsaturated End Group Generated During the Disproportionation in Termination Reaction of Methyl Methacrylate Polymerization: A Study Using Model Compounds", Journal of Polymer Science: Part A: Polymer Chemistry, Apr. 1989, vol. 27, Issue 5, pp. 1741-1748, John Wiley & Sons, Inc.

Dietrich Braun, "Initiation of Free Radical Polymerization by Thermal Cleavage of Carbon-Carbon Bonds", Macromolecular Symposia, Dec. 1996, vol. 111, Issue 1, pp. 63-71, Hüthig & Wepf Verlag, Germany. (Abstract).

Wade A. Braunecker, et al., "Controlled/living Radical Polymerization: Features, Developments, and Perspectives", Prog. Polym. Sci., 2007, vol. 32, pp. 93-146, Elsevier.

* cited by examiner

SURFACE-ACTIVE COMB COPOLYMERS

CROSS REFERENCE TO RELATED APPLICATIONS

This application is a national stage application of International Application No. PCT/EP2012/001931, filed 4 May 2012, which claims priority from European Patent Application No. 11005094.5, filed 22 Jun. 2011, from which applications priority is claimed, and which are incorporated herein by reference.

The present invention relates to a copolymer, the preparation of the copolymer, a composition a dispersion and the use of the copolymer.

In practice, comb copolymers which have groups or polymer chain segments with different functionalities or polarities are used, among other things, as a wetting agent and dispersants as well as emulsifiers. Often, depending on the structure, the use of such comb copolymers is either limited to special aqueous systems or alternatively, to nonpolar solvent-based systems. Frequently, comb copolymers based on styrene/maleic anhydride resins (SMA resins) are used.

Such comb copolymers based on SMA resins are described in U.S. Pat. No. 7,078,464 (B) and in U.S. Pat. No. 6,211,299 (A), which in particular comprise polyether side chains and thus can be used as surface-active additives. Said additives, however, have the disadvantage that particularly due to the polyether side chains they can be used suitably only in comparatively polar media as surface-active additives, as well as deaerator additive.

The object underlying the present invention is to provide a high quality surface-active additive which can be used successfully in particular also in conjunction with non-polar media as wetting agent and dispersant as well as a compatibilizer.

The solution to this problem is a copolymer whose overall structure as such, and/or an optionally present segment A of the overall structure having at least 10 bivalent structural units, contain as bivalent structural units, in each case,
  i) 40-90 mol % of a basic structural unit (I),
  ii) 10-60 mol % of a nonpolar dicarboxylic acid derivative structural unit (II),
  iii) 0-50 mol % of a polar dicarboxylic acid derivative structural unit (III),
  iv) 0-50 mol % of an oxygen group structural unit (IV), and
  v) 0-40 mol % of a head group structural unit (V), wherein the basic structural unit (I) is produced by reacting a monomer (Ix) containing an olefinic double bond, and does not include any species coming under said structural units (II) to (V), said nonpolar dicarboxylic acid derivative structural unit (II) is present in accordance with one or more of the formulas from the group consisting of (IIa), (IIb), (IIc), and (IId)

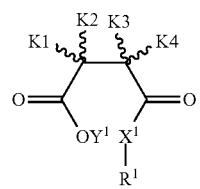
(IIa)

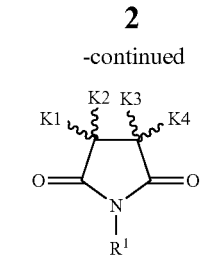
(IIb)

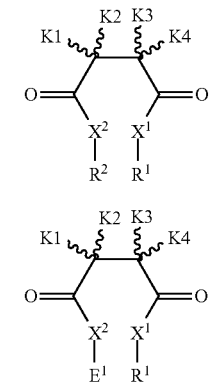
(IIc)

(IId)

wherein
K1, K2, K3 and K4 each are the same or different, and are each represented by connectivity options in the polymer chain with the proviso, that exactly two of said connectivity options are realized per general formula, $X^1$ and $X^2$ are the same or different and each independently are represented by $NR^x$ and/or O
  wherein $R^x$ is the same or different and is represented by H and/or a branched or unbranched $C_1$-$C_{12}$ alkyl radical, $Y^1$ is the same or different and is represented by H, a branched or unbranched $C_1$-$C_{24}$ alkyl radical, a $C_6$-$C_{18}$ aryl radical and/or a branched or unbranched $C_6$-$C_{18}$-arylalkyl radical, $R^1$ and $R^2$ each are the same or different and are each independently represented by a branched or unbranched, saturated or unsaturated hydrocarbon radical having at least 50 carbon atoms, $E^1$ is same or different and is represented by a branched or unbranched organic radical which contains at least four functional groups which are present in the form of ether groups and/or ester groups, said polar dicarboxylic acid derivative structural unit (III) is present in accordance with one or more of the formulas from the group consisting of (IIIa) and (IIIb)

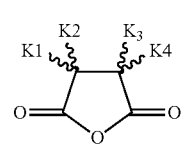
(IIIa)

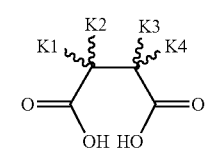
(IIIb)

wherein

K1, K2, K3 and K4 each are the same or different, and are each represented by connectivity options in the polymer chain with the proviso, that exactly two of said connectivity options are realized per general formula, said oxygen group structural unit (IV) does not include any species coming under dicarboxylic acid derivative structural unit (II) and is present in accordance with one or more of the formulas from the group consisting of (IVa), (IVb), (IVc), and (IVd)

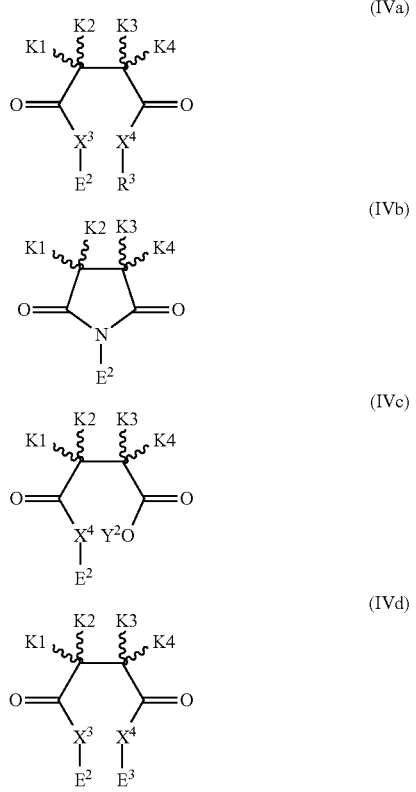

wherein

K1, K2, K3 and K4 each are the same or different, and are each represented by connectivity options in the polymer chain with the proviso, that exactly two of said connectivity options are realized per general formula, $X^3$ and $X^4$ each are the same or different and each independently of one another are represented by $NR^y$ and/or O wherein $R^y$ is the same or different and is represented by H and/or a branched or unbranched $C_1$-$C_{12}$ alkyl radical, $Y^2$ is the same or different and is represented by H, a branched or unbranched $C_1$-$C_{24}$ alkyl radical, a $C_6$-$C_{18}$ aryl radical and/or a branched or unbranched $C_6$-$C_{18}$-arylalkyl radical, $R^3$ is the same or different and is represented by a substituted (suitable substituents include: OH, aliphatic and aromatic tertiary amines, optionally heterocyclic alkoxy groups, alkoxysilyl groups, alkynyl groups; preferably OH, tertiary aliphatic or aromatic amines) or unsubstituted, branched or unbranched $C_1$-$C_{40}$ alkyl group, by a substituted (suitable substituents include: OH, aliphatic and aromatic tertiary amines, optionally heterocyclic alkoxy groups, alkoxysilyl groups, alkynyl groups; preferably OH, tertiary aliphatic or aromatic amines) or unsubstituted, branched or unbranched $C_1$-$C_{40}$ alkenyl group; by a substituted (suitable substituents include: OH, aliphatic and aromatic tertiary amines, optionally heterocyclic alkoxy groups, alkoxysilyl groups, alkynyl groups; preferably OH, tertiary aliphatic or aromatic amines) or unsubstituted $C_6$-$C_{18}$ aryl group, a substituted (suitable substituents include: OH, aliphatic and aromatic tertiary amines, optionally heterocyclic alkoxy groups, alkoxysilyl groups, alkynyl groups; preferably OH, tertiary aliphatic or aromatic amines) or unsubstituted, branched or unbranched $C_7$-$C_{18}$ arylalkyl group and/or a substituted (suitable substituents include: OH, aliphatic and aromatic tertiary amines, optionally heterocyclic alkoxy groups, alkoxysilyl groups, alkynyl groups; preferably OH, tertiary aliphatic or aromatic amines) or unsubstituted cycloalkyl group, $E^2$ is same or different and is represented by a branched or unbranched organic radical which contains altogether at least four functional groups which are present in the form of ether groups and/or ester groups, $E^3$ is same or different and is represented by a branched or unbranched organic radical which contains altogether at least four functional groups which are present in the form of ether groups and/or ester groups, and said head group structural unit (V) does not include any species coming under structural units (II) and (IV) and is present in accordance with one or more of the formulas from the group consisting of (Va), (Vb), (Vc), and (Vd)

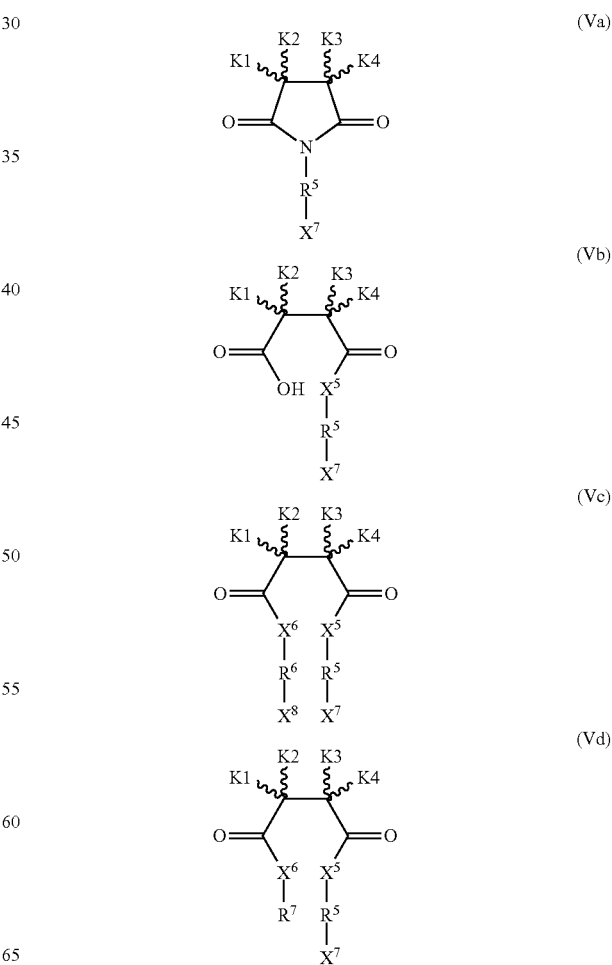

wherein

K1, K2, K3 and K4 each are the same or different, and are each represented by connectivity options in the polymer chain with the proviso, that exactly two of said connectivity options are realized per general formula, $X^5$ and $X^6$ each are the same or different and each independently of one another are represented by $NR^z$ and/or O wherein $R^z$ is the same or different and is represented by H and/or a branched or unbranched $C_1$-$C_{12}$ alkyl radical, $X^7$ and $X^8$ each are the same or different and each independently from one another is represented by a phosphoric acid ester group, a phosphonic acid ester group, a N,N-disubstituted amino group of the general formula (VA)

(VA)

and/or a quaternary ammonium group of the general formula (VB)

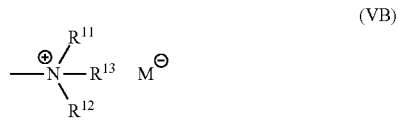

(VB)

wherein $R^{11}$, $R^{12}$ and $R^{13}$ each are the same or different and each independently of one another are represented by a substituted (suitable substituents include OH, alkoxy, aryloxy) or unsubstituted, branched or unbranched $C_1$-$C_{24}$-alkyl group, by a substituted (suitable substituents include OH, alkoxy, aryloxy) or unsubstituted $C_4$-$C_{10}$-cycloalkyl group, by a substituted (suitable substituents include OH, alkoxy, aryloxy) or unsubstituted $C_6$-$C_{18}$ aryl group and/or a substituted (suitable substituents include OH, alkoxy, aryloxy) or unsubstituted, branched or unbranched $C_7$-$C_{18}$ arylalkyl group (particularly preferably $R^{11}$, $R^{12}$ and $R^{13}$ each are represented by methyl, ethyl and/or benzyl), wherein $R^{11}$ and $R^{12}$ together with each other can form a substituted (suitable substituents include OH, alkoxy, aryloxy) or unsubstituted $C_4$-$C_{10}$-cycloalkyl group, and $M^-$ is the same or different and is represented by a carboxylate (preferably a carboxylate of an aliphatic or aromatic monocarboxylic acid, particularly preferably a carboxylate of an aromatic monocarboxylic acid), a phosphate, a phosphate ester (preferably a monophosphate), a sulfate and/or a halide (preferably chloride, bromide and/or iodide), $R^5$ and $R^6$ each are the same or different and are each independently of one another are represented by a substituted (suitable substituents include: OH, alkoxy and/or phenoxy; preferred substituents are alkoxy and phenoxy) or unsubstituted, branched or unbranched $C_1$-$C_{24}$ alkylene group and/or a substituted (suitable substituents include: OH, alkoxy and/or phenoxy; preferred substituents are alkoxy and phenoxy) or unsubstituted $C_6$-$C_{18}$ arylene group, $R^7$ is the same or different and is represented by a substituted (suitable substituents include: OH, tertiary aliphatic and aromatic amines, heterocyclic alkoxy groups, alkoxysilyl groups, alkynyl groups; preferably OH, aliphatic or aromatic tertiary amines) or unsubstituted, branched or unbranched $C_1$-$C_{40}$ alkyl group, by a substituted (suitable substituents include: OH, tertiary aliphatic and aromatic amines, heterocyclic alkoxy groups, alkoxysilyl groups, alkynyl groups; preferably OH, aliphatic or aromatic tertiary amines) or unsubstituted, branched or unbranched $C_1$-$C_{40}$ alkenyl group; by a substituted (suitable substituents include: OH, aliphatic and aromatic tertiary amines, heterocyclic alkoxy groups, alkoxysilyl groups, alkynyl groups; preferably OH, aliphatic or aromatic tertiary amines) or unsubstituted $C_6$-$C_{18}$ aryl group, a substituted (suitable substituents include: OH, tertiary aliphatic and aromatic amines, heterocyclic alkoxy groups, alkoxysilyl groups, alkynyl groups; preferably OH, aliphatic or aromatic tertiary amines) or unsubstituted, branched or unbranched $C_7$-$C_{18}$ arylalkyl group and/or a substituted (suitable substituents include: OH, tertiary aliphatic and aromatic amines, heterocyclic alkoxy groups, alkoxysilyl groups, alkynyl groups; preferably OH, aliphatic or aromatic tertiary amines) or unsubstituted $C_4$-$C_{10}$ cycloalkyl group.

The copolymer of the invention may be wholly or partially salified, depending on its environment, such as by deprotonation of the acid groups of the structural units II, III, IV and/or V, or by a protonation of amino groups of the structural units IV and/or V.

The statement "K1, K2, K3 and K4 each are the same or different, and are each represented by connectivity options in the polymer chain with the proviso, that exactly two of said connectivity options are realized per general formula" expresses that the species of bivalent structural units (II) to (V) each, in principle, are present on the basis of maleic acid derivatives or based on itaconic acid derivatives. In the case of a polymerized maleic acid derivative either K1 or K2 and either K3 or K4 are present as connectivities (linkages in the chain). This represents a preferred embodiment of the invention and is realized in general in all the structural units (II) to (V). In case of a polymerized itaconic acid derivative, however, either K1 and K2, or alternatively, K3 and K4 are present as connectivities. In principle, there is also the possibility that the copolymer of the present invention includes both corresponding maleic acid derivatives and corresponding itaconic acid derivatives.

The copolymer of the invention has a particularly high surface activity and can be successfully used also in conjunction with non-polar media as a surface-active additive. Specifically, the copolymer according to the invention is suitable as wetting agent and dispersant, particularly for solid particles such as pigments and fillers (liquid-solid interface). Furthermore, the copolymer of the invention can be used in an excellent manner as compatibilizers for mutually incompatible liquids (liquid-liquid interface). A further application is the use as a defoamer or deaerator (liquid-gas interface).

The universal applicability (compatibilizer, and wetting agent and dispersants) as well as the special suitability for particular application profiles is determined primarily by the bivalent structural units present in the copolymer of the invention.

The nonpolar dicarboxylic acid structural unit (II) causes an affinity for non-polar media due to the long hydrocarbon residue contained, and must be considered to be an inert constituent of the molecule, which is promoting environmental compatibility and increased quality.

By the basic structural unit (I), the long side chains (e.g., of the dicarboxylic acid derivative structural unit (II)) are "held at a distance" (depending on grafting density/drafting yield) and also depending on the choice of the olefinic double bond-containing monomer (Ix) producing said basic structural unit (I), the polarity and affinity of the copolymer of the invention are specifically influenced.

The (optionally present) polar dicarboxylic acid unit (III) has, in its hydrolyzed form, acid groups that provide an affinity for basic surfaces (e.g. basic pigments). The structural unit type (III) is produced in the preparation of the copolymer of the invention (by polymerization and subsequent grafting—see below), particularly when a correspondingly small grafting density and a small grafting yield are present.

The (optionally present) oxygen group structural unit (IV) gives the copolymer of the invention also a greater affinity to polar media. This is particularly the case where the structural unit (IV) contains ether radicals, in particular ethylene oxide radicals and/or propylene oxide radicals. Such ether radicals are to still be regarded as relatively inert, especially hydrolysis-stable molecular constituents, which are to be regarded in general as quality-improving.

The (optionally present) head group structural unit (V) must be regarded as a salt-forming molecular constituent that can interact preferably with acidic or basic surfaces and, can take on an adhesion group function, for example.

Basically, by appropriate selection of the bivalent structural units (I) to (V) the desired property as a wetting agent and dispersant as well as a compatibilizer can be provided. Although not preferred, it is, however, not excluded that the copolymer according to the invention has further bivalent structural units besides the structural units (I) to (V).

In a preferred embodiment of the invention, the overall structure of the copolymer according to the invention and/or the optionally present segment A as bivalent structural units, in each case
  i) 30-75, preferably 35-70 mol % of said basic structural unit (I),
  ii) 15-55, preferably 17-50 mol % of said non-polar dicarboxylic acid structural unit (II),
  iii) 0-30, preferably 0-10 mol-% of said polar dicarboxylic acid structural unit (III),
  iv) 0-35, preferably 0-30 mol % of the oxygen group structural unit (IV), and
  v) 0-20, preferably 0-10 mol % of the head group structural group (V).

In a further embodiment of the invention, the overall structure of the copolymer according to the invention and/or the optionally present segment A as bivalent structural units, in each case
  i) 40-75, preferably 40-70 mol % of said basic structural unit (I),
  ii) 20-50, of said non-polar dicarboxylic acid structural unit (II),
  iii) 0-10 mol-% of said polar dicarboxylic acid structural unit (III),
  iv) 5-25, preferably 8-20 mol % of the oxygen group structural unit (IV), and
  v) 0-10 mol % of the head group structural group (V).

In a specific embodiment of the invention, the overall structure of the copolymer according to the invention and/or the optionally present segment A as bivalent structural units, in each case
  i) 45-67 mol % of said basic structural unit (I),
  ii) 23-50 mol % of said non-polar dicarboxylic acid structural unit (II),
  iii) 0-5 mol-% of said polar dicarboxylic acid structural unit (III),
  iv) 10-20 mol % of the oxygen group structural unit (IV), and
  v) 0-5 mol % of the head group structural group (V).

Preferably, the copolymer according to the invention contains 10-500, particularly preferably 15-300 structural units which are selected from the group of bivalent structural units (I) to (V).

Typically, said olefinic double bond-containing monomer (Ix) producing said basic structural unit (I) is selected from one or more of the monomers of the group consisting of alkyl (meth)acrylates, alkenyl (meth)acrylates of straight-chain, branched or cycloaliphatic monoalcohols having 1 to 22 carbon atoms, or of straight-chain or branched aromatic or mixed aromatic-aliphatic monoalcohols having 1 to 22 carbon atoms, mono (meth)acrylates of oligomeric or polymeric ethers, (meth)acrylates of halogenated alcohols; oxirane-containing (meth)acrylates, styrene, substituted styrenes, α-olefins, vinyl ethers, allyl ethers; methacrylonitrile, acrylonitrile; vinyl group-containing cycloaliphatic heterocycles having at least one nitrogen atom as a ring member, vinyl esters of monocarboxylic acids having 1 to 20 carbon atoms, N-alkyl and N,N-dialkyl-substituted acrylamides with straight-chain, branched or cycloaliphatic alkyl groups having 1 to 22 carbon atoms, ethylenically unsaturated monomers having at least one carboxylic acid, phosphonic acid, phosphoric acid and/or sulfonic acid group, and unsaturated fatty acids.

Species of said basic types of the monomer (Ix) In detail above is not said species can be used for example:

Methyl methacrylate, ethyl methacrylate, n-butyl methacrylate, i-butyl methacrylate, t-butyl methacrylate, lauryl methacrylate, 2-ethylhexyl methacrylate, stearyl methacrylate, tridecyl methacrylate, cyclohexyl methacrylate, isobornyl methacrylate, allyl methacrylate, t-butyl methacrylate, aryl methacrylates, substituted or unsubstituted benzyl methacrylate, and substituted or unsubstituted phenyl methacrylate, such as 4-nitrophenyl methacrylate; hydroxyalkyl methacrylates of straight-chain, branched or cycloaliphatic diols having 2 to 36 carbon atoms, such as 3-hydroxypropyl-3,4-dihydroxybutyl monomethacrylate, 2-hydroxyethyl methacrylate, 4-hydroxybutyl methacrylate, 2-hydroxypropyl methacrylate, 2,5-dimethyl-1,6-hexanediol monomethacrylate, hydroxyphenoxypropyl methacrylate, mono methacrylates of polyethylene glycols, polypropylene glycols or mixed polyethylene/propylene glycols, poly(ethylene glycol) methylether methacrylate, poly(propylene glycol) methylether methacrylate having 5 to 80 carbon atoms, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxy-ethyl methacrylate, 2-ethoxyethyl methacrylate, allyloxymethyl methacrylate, 1-ethoxybutyl methacrylate, 1-ethoxyethyl methacrylate, ethoxymethyl methacrylate, caprolactone and/or valerolactone-modified hydroxyalkyl methacrylates having a molecular weight of 220-1200, wherein the hydroxy methacrylates are preferably derived from straight-chain, branched or cycloaliphatic diols having 2 to 8 carbon atoms; perfluoroalkyl methacrylates having 6 to 20 carbon atoms; oxirane-containing methacrylates, preferably 2,3-epoxybutyl methacrylate, 3,4-epoxybutyl methacrylate, glycidyl methacrylate; α-methylstyrene, 4-methyl styrene; 1-hexene, 1-heptene, 1-octene, 1-nonene, 1-decene, 1-undecene, 1-dodecene; 1-[2-(methacrylyloxy)-ethyl]-2-imidazolidine, N-vinylpyrrolidone, N-vinylcaprolactam, vinyl acetate; N-(t-butyl) acrylamide, N,N-dimethylacrylamide, (meth) acrylic acid, carboxyethyl methacrylate, citraconic acid, crotonic acid, cinnamic acid, vinylsulfonic acid, 2-methyl-2-[(1-oxo-2-propenyl)amino]-1-propanesulfonic acid, styrenesulfonic acid, vinylbenzene sulfonic acid, vinyl phosphonic acid and esters thereof, vinyl phosphoric acid, and esters thereof, 2-(meth)acryloyloxyethyl phosphate, 3-(meth)acryloyloxypropyl phosphate, 4-(meth)acryloyloxybutyl phosphate, 4-(2-methacryloyloxyethyl) trimellitic acid and acidic groups mentioned in EP-A-1674067, and a polymerizable double bond-containing monomers.

Following polymerization, the respective structural units derived from said ethylenically unsaturated monomers, may be further modified.

Thus, for example, oxirane structures can be reacted with nucleophilic compounds such as 4-nitrobenzoic. Hydroxy groups can be reacted with lactones, such as ε-caprolactone, for example, to form polyesters, and from ester groups polymer structural units having OH groups can be liberated by acid- or base-catalyzed ester cleavage.

Other possible modifications are represented by, e.g., the reaction of structural units obtainable by polymerization of OH-group-containing ethylenically unsaturated monomers such as hydroxyalkyl methacrylates, with corresponding reactive cyclic carboxylic acid anhydrides under formation of the acidic half-esters thereof, or the reaction of the OH groups with sultones, or the reaction of the OH groups with phosphorylating agents, or the carboxymethylation of these OH groups.

Modification can be made also by hydrolysis of structural units of the copolymers.

Typical structural units obtainable by corresponding grafting as modification are, for example, the following units (XXa) and (XXb), wherein $R^3$ and $X^3$ each have the above mentioned correspondences:

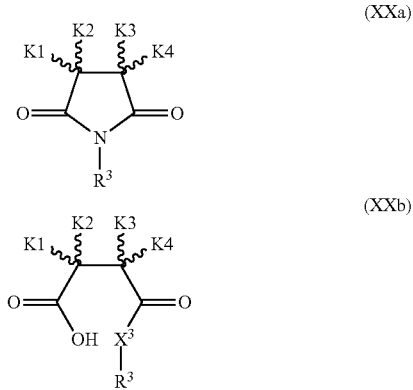

(XXa)

(XXb)

Often, at least 60 mol %, preferably at least 90 mol % of the structural units corresponding to the basic structural unit (I) are produced by reaction of styrene and/or derivatives thereof, α-olefins, acrylates and/or methacrylates. However, particularly preferably at least 60 mol %, preferably at least 90 mol % of the structural units corresponding to the basic structural unit (I) are produced by reaction of styrene.

In a preferred embodiment of the invention, the copolymers of the invention are based on the precursors thereof present as SMA resins (which are modified by grafting—see below) with a styrene-maleic anhydride ratio of 1:1 to 8:1, preferably from 1:1 to 4:1, particularly preferably from 1:1 to 2:1.

The surface-active effect of nonpolar dicarboxylic acid derivative structural unit (II) is substantially determined by the selection of the radicals contained therein, in particular by $R^1$, and (if present) $R^2$.

In a preferred embodiment of the invention, $R^1$ and $R^2$ each are the same or different and are each independently represented by a branched or unbranched alkyl radical and/or a branched or unbranched alkenyl radical, each preferably present in the form of polyolefin radicals each based on olefins (as a monomer unit) containing 2-8 carbon atoms.

In general, $R^1$ and $R^2$ each are the same or different and are each independently represented by a polyisobutylene radical and/or a non-hydrogenated, partially hydrogenated and/or fully hydrogenated polybutadiene radical and/or a non-hydrogenated, partially hydrogenated and/or fully hydrogenated polyisoprene radical. Corresponding polyolefins with functional terminal groups are known. For example, access to hydroxy- or amino-functional polyisobutylenes are described in U.S. Pat. No. 7,291,681, U.S. Pat. No. 6,875,897, and US 20080274924.

Often, at least 60 mol %, preferably at least 80 mol % of the radicals, which are present as $R^1$ and/or $R^2$, are represented by a polyisobutylene having 50-200, preferably 60-120 carbon atoms.

The overall structure of the copolymer according to the invention as such and/or the optionally present segment A may contain 0.1 to 10 mol % of the polar dicarboxylic acid derivative structural unit (III) as bivalent structural units.

Under conditions promoting hydrolysis, the structural unit (III) is usually not present as maleic anhydride structural unit, rather as maleic acid structural unit which is present depending on the environment salified or deprotonated.

The overall structure of the copolymer according to the invention as such and/or the optionally present segment A may include 1-10 mol % of the oxygen group structural unit (IV) as bivalent structural units.

$E^2$ (optionally together with $E^3$) is to be regarded as the characteristic radical of the oxygen group structural unit (IV) having ester and/or ether groups.

Typically, $E^2$ and $E^3$ are the same or different and usually contain 4-300, preferably 10-100, particularly preferably 12-50 ether oxygen atoms.

Preferably obtainable by grafting with corresponding polyalkylene oxide monoamines, $E^2$ is the oxygen group structural unit (IV) is present as a polyalkylene oxide chain, which is connected via an amide or imide linkage to the maleic acid framework. Said polyalkylene oxide monoamines used as grafting reagents are typically $C_1$-$C_{24}$ alcohol-started polyethers (manufactured by way of alkoxylation—and thus containing terminally an alkyl group), which are composed primarily of ethylene oxide, propylene oxide, butylene oxide and/or styrene oxide and carry as a terminal group a primary or secondary, preferably a primary amino group (preferably as the only group active for grafting). Furthermore, it is also possible to have repeat units on the basis of monoglycid ethers, monoglycid esters, oxetanes and/or tetrahydrofuran as monomers—optionally in combination with the aforementioned epoxide monomers as building blocks. In general, these polyalkylene oxide monoamines are based exclusively on ethylene oxide and/or propylene oxide, wherein the weight ratio of ethylene oxide to propylene oxide is variable. To produce a more polar $E^2$ radical correspondingly more ethylene oxide is used (optionally exclusively ethylene oxide), wherein the polarity and the corresponding crystallization tendency can be reduced by the use of propylene oxide. The molecular weight of the polyalkylene oxide monoamines typically used is usually between 150 and 12500 g/mol, preferably between 500 and 5,000 g/mol, particularly preferably between 700 and 3,000 g/mol. Alternatively, other grafting reagents can be used to provide the radical $E^2$ such as monohydroxy-terminated polyethers, monohydroxy-terminated polyesters and/or monohydroxy-terminated polyether-polyester block copolymers. The preferred repeat units of the corresponding polyether structures are ethylene oxide, propylene oxide, butylene oxide, styrene oxide, alkyl glycidyl ether and/or phenyl glycidyl ether-based repeat units. Depending on the desired polarity of $E^2$, the selection from ethylene oxide and propylene oxide is made accordingly, wherein the molecular weight of the polyether chain is typically between 300 g/mol and 5,000 g/mol. Suitable monohydroxy-terminated polyesters and monohydroxy-terminated polyether-polyester block copolymers are those starting from "monohydroxy starting components", obtainable by the polymerization of one or more (optionally alkyl substituted) hydroxycarboxylic acids and/or their lactones (such as butyrolactone, valerolactone, caprolactone, especially ε-caprolactone). Corresponding structures generally have a molecular weight of 150 to 5,000 g/mol.

What has been said above with regard to $E^2$ is true accordingly for $E^3$.

The overall structure of the copolymer according to the invention as such and/or the optionally present segment A can contain in each case 1-10 mol % of the head group structural unit as bivalent structural units.

Typical grafting reagents that can be used to prepare the head group structural unit (V) are N,N-disubstituted diamines. N,N-disubstituted diamines have the general structure $R^{21}R^{22}N$—R'—$NR^{23}H$. Here, $R^{21}$ and $R^{22}$ can be the same or different, an aliphatic, cyclic or aromatic or aliphatic-aromatic hydrocarbon substituent, such as a methyl, ethyl, propyl, 2-ethylhexyl, cyclohexyl, benzyl or phenyl substituent. $R^{23}$ may be the same or different, in the meaning of $R^{21}$ or hydrogen. Preferably, $R^{21}$ and $R^{22}$ are methyl and ethyl substituents, and $R^{23}$ is hydrogen.

Here, R' can be an aliphatic, cyclic or aromatic or aliphatic-aromatic hydrocarbon radical.

Preferred N,N-disubstituted diamines are N,N-dialkylaminoalkylamines as N,N-dimethylaminoethylamine, N,N-dimethylaminopropylamine, N,N-diethylaminoethylamine and N,N-diethylaminopropylamine.

For the production of comb copolymers according to the invention, optionally, amino alcohols can also be used in addition to these functionalized hydrocarbons. Amino alcohols have the general structure $R^{31}R^{32}N$—R"—OH. Here, $R^{31}$ and $R^{32}$ can be the same or different, are in the meaning of hydrogen or $R^{21}$ and R" in the meaning of R'. Typical amino alcohols are hydroxyalkylamines such as hydroxyethylamine, hydroxypropylamine, hydroxybutylamine and higher homologs. Preferred amino alcohols are N,N-disubstituted aminoalkylalcohols such as N,N-dimethylaminoethanol and N,N-diethylaminoethanol.

In a subsequent alkylation reaction the optionally used N,N-disubstituted diamines or amino alcohols may be reacted at the tertiary amine function under formation of partially or fully quaternary ammonium salts. For alkylation, for example, organic halides such as benzyl chloride, methyl iodide or alkylating agents such as dimethyl sulfate, or a combination of oxiranes, such as a glycidyl ether or styrene oxide, with acids such as carboxylic acids may be used.

When using primary hydroxyalkylamines the amino group reacts preferentially with the anhydride group of the base polymer, so that the unreacted hydroxyl function is then available for further modifications, such as phosphorylation (e.g. using polyphosphoric acid under formation of phosphoric acid esters), or a reaction with a cyclic acid anhydride (for example maleic anhydride, succinic anhydride, phthalic anhydride) under formation of an acidic half-ester.

In a specific embodiment of the invention, the overall structure of the copolymer according to the invention contains on one the hand said segment A and on the other hand at least one further segment B containing bivalent structural units, wherein said segment A is present as a block A and said segment B is present as a block B bound to block A, which differs from block A in respect to the concentration of the bivalent structural units (I)-(V) and/or in respect to the nature of the bivalent structural units.

If the copolymer of the present invention is present as a block copolymer, it usually contains at least 5 structural units per block, preferably, the minimum number of structural units per block is 10. In each of the blocks the same structural units may be present, however, in different numbers or concentrations, wherein the blocks may also contain different repeat units. A linear or branched copolymer precursor usable for the preparation of the copolymer according to the invention has, for example, a block structure of the type A-B, A-B-A, B-A-B, A-B-C and/or A-C-B, wherein the blocks A, B and C each must differ only in the composition or concentration of the structural units. Said difference in composition or concentration means in this context that in two adjacent blocks the proportion of the structural units must differ from one another at least by 5% by weight, based on total amount of the respective block.

The invention also relates to the preparation of the copolymer according to the invention. Suitably, the preparation of the copolymer according to the invention is carried out in that in a previous step, a copolymer precursor is prepared by polymerization, wherein in a subsequent step the nonpolar dicarboxylic acid derivative structural unit (II) and optionally in each case the oxygen group structural unit (IV) and/or the head group structural group (V) is formed by grafting reaction.

In general, the copolymer precursor has a number average molecular weight of 600-25,000 g/mol, preferably 800-10,000 g/mol, particularly preferably 1,000-5,000 g/mol.

The number average molecular weight is determined by gel permeation chromatography in accordance with DIN 55672.

Preferably, the linear or branched maleic anhydride-based precursor products usable to prepare the copolymers according to the invention can be prepared by free radical-initiated polymerization, for example, using azo or peroxide initiators. To set the desired molecular weight, chain controllers (chain transfer agents), such as thiols, secondary alcohols or alkyl halides such as carbon tetrachloride can be added during the polymerization. Other possible preparation methods relate to radical polymerization methods. Depending on which of the following controlled polymerization techniques is used in each case, different copolymers will be obtained even with use of identical ethylenically unsaturated monomers, and even in the same molar ratios of the monomers, because different polymerization techniques can lead to different microstructures and to different sequences of the structural units, respectively. The methods of controlled radical polymerization are known from the literature. An overview of some methods can be found in Prog. Polym. Sci. 32 (2007) 93-146 and in Chem. Rev. 2009, 109, 4963-5050.

Below, some technologies for carrying out controlled polymerizations are provided in exemplary fashion:

"Atom Transfer Radical Polymerization" (ATRP) allows for controlled polymerization and is described, for example, in Chem. Rev. 2001, 101, 2921 and Chem. Rev. 2007, 107, 2270-2299.

Controlled polymerization methods include also the "Reversible Addition Fragmentation Chain Transfer Process" (RAFT), which is also called "MADIX" (macromolecular design via the interchange of xanthates) and "Addition Fragmentation Chain Transfer" when certain polymerization modifiers are used. RAFT is described, for example, in Polym. Int. 2000, 49, 993, Aust. J. Chem 2005, 58, 379, J. Polym. Sci. Part A: Polym. Chem. 2005, 43, 5347, Chem. Lett. 1993, 22, 1089, J. Polym. Sci., Part A, 1989, 27, 1741 and 1991, 29, 1053, and 1993, 31, 1551, and 1994, 32, 2745, and 1996, 34, 95 and 2003 41, 645, and 2004, 42, 597, and 2004, 42, 6021 and also in Macromol. Rapid Commun. 2003, 24, 197, in Polymer 2005, 46, 8458-8468, and Polymer 2008, 49, 1079-1131, and in U.S. Pat. No. 6,291,620, WO 98/01478, WO 98/58974, and WO 99/31144.

According to a further method for the controlled polymerization, nitroxyl compounds are used as polymerization modifiers (NMP), as disclosed in Chem. Rev. 2001, 101, 3661.

Another controlled polymerization method is "Group Transfer Polymerization" (GTP) as disclosed by O. W. Webster in "Group Transfer Polymerization", in "Encyclopedia of Polymer Science and Engineering", Volume 7, H. F. Mark, N. M. Bikales, C. G. Overberger and G. Menges, eds., Wiley Interscience, New York, 1987, pp. 580, and in O. W. Webster, Adv. Polym. Sci. 2004, 167, 1-34.

Controlled radical polymerization using tetraphenylethane as described in Macromol. Symp., 1996, 111, 63, is another example.

A controlled radical polymerization using 1,1-diphenylethene as polymerization modifier is described, for example, in Macromolecular Rapid Communications, 2001, 22, 700.

The controlled radical polymerization using organo-tellurium, organo-antimony and organo-bismuth chain transfer agents is described in Chem. Rev. 2009, 109, 5051-5068.

Furthermore, a controlled radical polymerization using iniferters is described, for example, in Makromol. Rapid Chem. Commun. 1982, 3, 127.

A controlled radical polymerization using organo-cobalt complexes is known, for example, from J. Am. Chem. Soc. 1994, 116, 7973, from Journal of Polymer Science: Part A: Polymer Chemistry, vol. 38, 1753-1766 (2000), from Chem. Rev. 2001, 101, 3611-3659, and from Macromolecules 2006, 39, 8219-8222.

Another controlled radical polymerization method is Reversible Chain Transfer Catalyzed Polymerization, such as is described in Polymer 2008, 49, 5177.

As a further controlled polymerization technique, Degenerative Chain Transfer with iodine compounds may be used, as described in Macromolecules 2008, 41, 6261, in Chem. Rev. 2006, 106, 3936-3962 or U.S. Pat. No. 7,034,085.

The controlled radical polymerization in the presence of thioketones is described, for example, in Chem. Commun. 2006, 835-837 and in Macromol. Rapid Commun. 2007, 28, 746-753.

For this purpose, the resulting copolymers (precursors of the copolymer according to the invention) are not necessarily defined by the polymerization modifier as terminal group. Following polymerization, for example, the terminal group may be cleaved completely or in part. Thus, for example, the nitroxyl terminal groups of the copolymers that were produced by means of NMP, can be cleaved thermally.

The application of controlled radical polymerization methods also opens up the possibility for the production of structured copolymers.

Structured copolymers are linear block copolymers, gradient-like copolymers, branched/star-shaped block copolymers and comb copolymers.

In the case of gradient-like copolymers, inter alia, that may be used, the concentration of the structural units of a particular ethylenically unsaturated monomer, or of the structural units of a mixture of ethylenically unsaturated monomers decreases continuously along the polymer chain, and the concentration of structural units of an ethylenically unsaturated monomer different therefrom, or of structural units of a mixture of ethylenically unsaturated monomers different therefrom increases accordingly.

For examples of gradient-like copolymers reference is made to appropriate content in EP 1 416 019 and WO 01/44389, and Macromolecules 2004, 37, 966, Macromolecular Reaction Engineering, 2009, 3, 148, Polymer 2008, 49, 1567, and Biomacromolecules 2003, 4, 1386.

A preferred method of preparation of a copolymer according to the invention is characterized in that in the first step, a copolymer of maleic anhydride (a precursor), more preferably an SMA resin, optionally also present in the form of a block copolymer, optionally is provided in a form dissolved in a solvent, which is subjected, in a subsequent second step, to a grafting reaction. In this second step, it is typically reacted at temperatures of 20 to 200° C. with a mixture containing an amino- or hydroxy-functional hydrocarbon (preferably hydrocarbons which can be prepared via polymerization of an ethylenically unsaturated monomer), preferably with polyisobutylene monoalcohol, polyisobutylene monoamine, polybutadiene monoalcohol, polybutadiene monoamine, polyisoprene monoalcohol and/or polyisoprene monoamine, optionally in combination with one or more polyalkylene oxide monoamines and/or monohydroxy-terminated polyethers, monohydroxy-terminated or monoamino-terminated polyesters and/or monohydroxy-terminated or monoamino-terminated polyether-polyester block copolymers and/or N,N-di-substituted diamines and/or amino alcohols. Typically, this reaction is carried out in such a way that at least 70% of the anhydride structures are reacted. In said grafting the alcohols react with the anhydride structures to form esters, the amino groups react with the anhydride structures to form amides and imides. The lower the reaction temperature, the more favored is the amide formation and the higher the temperature is, the more favored is the imide formation.

For example, amides are formed almost exclusively at temperatures from 20° C. to 50° C. Temperatures of above 140° C. favor the imide formation. Since water is liberated in imidization, the anhydride structures of the copolymers may be reacted also with such water to form carboxylic acid functions. As coupling groups of the grafting reagents, secondary amino groups can naturally react exclusively to form amide groups, and hydroxyl groups to form ester groups.

In the reaction, the added solvent can be distilled off again, to remove, for example, water formed by the imidation by azeotropic distillation.

In a preferred manufacturing method, the SMA resins are dissolved homogeneously in a solvent or at least partially swollen before the reaction with the amines and/or alcohols. In comparison to a solvent-free procedure, this method ensures that all the anhydride groups along the SMA resin chains can react at the beginning of the reaction. Thus, a more homogeneous product is obtained.

Besides the above-described grafting reactions, further modifications (particularly grafts) of the copolymer, if any, may be carried out. Thus, for example, oxirane structures may be reacted with nucleophilic compounds such as 4-nitrobenzoic acid. Hydroxy groups may be reacted with lactones, such as ε-caprolactone to form polyesters, and from ester groups polymer structural units having OH-groups may be liberated by acid- or base-catalyzed ester cleavage.

The present invention further relates to a composition which can be prepared by mixing at least two components, each of which at the mixing temperature is present in liquid form, wherein 0.1-10% by weight, based on the total weight of the composition, of a copolymer according to the invention is added as third component as a compatibilizer.

In principle, it is possible that in this context, different species of the copolymer according to the invention are used in combination. Furthermore, the copolymers according to the invention may also be used together with other surface-active compounds to meet specific special requirements.

In a specific embodiment, the composition of the invention is present as an emulsion, containing 0.1 to 10% by weight of a copolymer according to the invention, 0.1 to 50% by weight of a homopolymer or copolymer of butadiene, and 10 to 70% by weight of an ethylenically unsaturated polymeric resin, which may be dissolved in an ethylenically unsaturated reactive diluent (and wherein the proportion by mass of the reactive diluent is included in the 10 to 70% by weight). Here, in a particularly preferred embodiment, the proportion of the butadiene structural units in the copolymer of butadiene is at least 33, preferably at least 50 mol %, and the ethylenically unsaturated polymeric resin is preferably present as unsaturated polyester or unsaturated vinyl ester which in each case preferably are present dissolved in styrene (reactive diluent).

Unsaturated polyester resins are known and are generally obtained by reaction of mono-unsaturated dicarboxylic acids with diols, and optionally also with the concomitant use of saturated carboxylic acids and (di)cyclopentadiene, as described, for example, in J. H. Aurer, A. Kasper, "Unsaturated Polyester Resins" Verlag Moderne Industrie, Landsberg/Lech, 2003. Particularly preferred bifunctional, ethylenically unsaturated carboxylic acids or their derivatives used for this purpose are maleic acid and fumaric acid and maleic anhydride. In addition, however, adipic acid, tetrahydrophthalic acid, phthalic acid, isophthalic acid, terephthalic acid, HET acid (hexachloro endomethylene tetrahydrophthalic acid) and glutaric acid, and the anhydrides of these carboxylic acids or Diels-Alder adducts of maleic anhydride and cyclopentadiene can also be used also as bifunctional saturated carboxylic acid component. In the preparation of unsaturated polyester resins, acrylic acid and methacrylic acid can be used also. For the reaction, preferably propylene glycol, dipropylene glycol, ethylene glycol, diethylene glycol and neopentyl glycol, and 1,4-butanediol, 1,6-hexanediol, alkoxylated bisphenol A and 2,2,4-trimethylpentane-1,3-diol are possible as the bifunctional alcohol component. Besides bifunctional carboxylic acids and alcohols, higher functional carboxylic acids and alcohols can be used also to obtain branched polycondensation products.

Furthermore, the present invention relates to a dispersion, containing a dispersing medium and dispersed particulate solid, which is preferably present in the form of an inorganic filler, and/or in the form of an inorganic or organic pigment and/or in the form of carbon nanotubes and/or in the form of graphenes, wherein 0.1-10% by weight, based on the total weight of the dispersion, of a copolymer according to the invention is added as wetting agent and dispersant.

It is also possible to use mixtures of various copolymers according to the invention in connection with this application. Furthermore, the inventive copolymers may also be used together with other surface-active compounds to meet specific special requirements.

Finally, the invention relates to the use of a copolymer according to the invention as a compatibilizer, as a deaerator additive or as wetting agent and dispersant.

In addition to the applications already mentioned above, the surface-active copolymers of the invention can be used as defoamers, leveling agents, impact modifier, or bonding agents.

The invention will be explained below with reference to exemplary embodiments.

EXAMPLES

A) Preparation of the Comb Copolymers

TABLE 1

Raw materials used for polymer synthesis

| Designation | Description |
|---|---|
| SMA base polymer 1 | Copolymer of styrene and maleic anhydride, molar ratio 1:1; molecular weight $M_n$ about 2000 |
| SMA base polymer 2 | Copolymer of styrene and maleic anhydride, molar ratio 2:1; molecular weight $M_n$ about 3000 |
| SMA base polymer 3 | Copolymer of styrene and maleic anhydride, molar ratio 4:1; molecular weight $M_n$ about 3600 |
| Polymer amine 1 solution | Polyisobutylene monoamine having a terminal primary amino group, 66% by weight solution in aliphatic hydrocarbon; Mn according to GPC: 1000 |
| Polymer amine 2 | Polyether monoamine having a terminal primary amino group, mole weight about 2000, molar ratio of ethylene oxide to propylene oxide repetition units about 31/10 |
| Polymer amine 3 | Polyether monoamine having a terminal primary amino group, molar weight about 2000, molar ratio of ethylene oxide to propylene oxide repetition units about 6/29 |
| Polymer amine 4 | Polyether monoamine having a terminal primary amino group, molar weight about 1000, molar ratio of ethylene oxide to propylene oxide repetition units about 19/3 |
| Polymer alcohol 1 | Polybutadiene monoalcohol; $M_n$ according to GPC: 7700 |
| Polymer alcohol 2 | Polyethylene glycol monomethylether; molar weight about 750 |
| Shellsol A | Solvent naphta (petroleum), light aromatic; complex combination of hydrocarbons from the distillation of aromatic runs; consists primarily of aromatic hydrocarbons having carbon numbers primarily in the range C8 to C10 |

Copolymer 1:

In a round-bottomed flask equipped with a reflux condenser, temperature sensor and precision glass stirrer (KPG), 10.00 g of SMA base polymer are dissolved under an atmosphere of nitrogen in 104.10 g of Shellsol A. 33.04 g of polymer amine 3 is added, and the mixture is stirred for 4 hours at 120° C. Then, 61.33 g of polymer alcohol 1 and 1.04 g of a 10% solution of dibutyl tin dilaurate in xylene is added, and the mixture is stirred for further 4 hours at 120° C. A slightly turbid, yellowish liquid of medium viscosity (50% solution of the comb copolymer in Shellsol A) is obtained.

Copolymer 2:

Under an atmosphere of nitrogen, a round-bottomed flask equipped with a reflux condenser, temperature sensor and precision glass stirrer (KPG) is charged with 25.00 g of a 50% solution of SMA base polymer 1 in 1-methoxy-2-propyl acetate, 57.80 g of polymer amine 2, 28.00 g of polymer amine 1 solution, and 46.70 g of 1-methoxy-2-propyl acetate, 39.50 g of Shellsol A, and 0.44 g of 2,6-di-tert-butyl-p-cresol, and heated with stirring to 120° C. The mixture is stirred for additional 4 h at 120° C. A slightly turbid, yellow liquid of medium viscosity is obtained (45% solution of comb copolymer).

Copolymer 3:

Under an atmosphere of nitrogen, a round-bottomed flask equipped with a reflux condenser, temperature sensor and precision glass stirrer (KPG) is charged with 25.00 g of a 50% solution of SMA base polymer 1 in 1-methoxy-2-propyl acetate, 19.30 g of polymer amine 2, 83.85 g of polymer amine 1 solution, 57.15 g of 1-methoxy-2-propyl acetate, 46.40 g of Shellsol A, and 0.44 g of 2,6-di-tert-butyl-p-cresol, and heated with stirring to 120° C. The mixture is stirred for additional 4 h at 120° C. A clear, yellow liquid of medium viscosity is obtained (38% solution of comb copolymer).

Copolymer 4:

Under an atmosphere of nitrogen, a round-bottomed flask equipped with a reflux condenser, temperature sensor and precision glass stirrer (KPG) is charged with 25.00 g of a 50% solution of SMA base polymer 1 in 1-methoxy-2-propyl acetate, 35.60 g of polymer amine 2, 51.60 g of polymer amine 1 solution, 47.60 g of 1-methoxy-2-propyl acetate, 40.10 g of Shellsol A, and 0.44 g of 2,6-di-tert-butyl-p-cresol, and heated with stirring to 120° C. The mixture is stirred for additional 4 h at 120° C. A clear, yellow liquid of low viscosity is obtained (41% solution of comb copolymer).

Copolymer 5:

Under an atmosphere of nitrogen, a round-bottomed flask equipped with a reflux condenser, temperature sensor and precision glass stirrer (KPG), a connection for a diaphragm vacuum pump and water separator is charged with 14.40 g SMA BASE POLYMER 1, 44.40 g of polymer amine 2, 64.40 g of polymer amine 1 solution, 44.7 g of Shellsol A, 90.80 g of 1-methoxy-2-propyl acetate and 0.50 g of 2,6-di-tert-butyl-p-cresol and heated with stirring to 160° C. The mixture is stirred under atmospheric pressure for 1 hour at 160° C., then 1 h at 170° C. and then for a further 10 h at 180° C. Then, the mixture is stirred for additional 2 hours at 180° C. under reduced pressure of 80 mbar distilling off residual water and part of the solvents present. The mixture is diluted with a 1/1 mixture of Shellsol A and 1-methoxy-2-propyl acetate until a non-volatile content of 45% is achieved. A yellow, clear liquid is obtained (45% solution of comb copolymer).

Copolymer 6:

Under an atmosphere of nitrogen, a round-bottomed flask equipped with a reflux condenser, temperature sensor and precision glass stirrer (KPG) is charged with 10.00 g of SMA base polymer 1, 89.40 g of polymer amine 1 solution and 99.40 g of Shellsol A and heated to 120° C. The mixture is stirred for further 8 h at 120° C. A yellow liquid is obtained (35% solution of comb copolymer).

Copolymer 7:

Under an atmosphere of nitrogen, a round-bottomed flask equipped with a reflux condenser, temperature sensor and precision glass stirrer (KPG) is charged with 10.00 g of SMA base polymer 1, 44.70 g of polymer amine 1 solution, 4.40 g oleylamine, and 59.10 g of Shellsol A and heated with stirring to 120° C. The mixture is stirred for further 8 h at 120° C. A yellow liquid is obtained (35% solution of comb copolymer).

Copolymer 8:

In a round-bottomed flask equipped with a reflux condenser, temperature sensor and precision glass stirrer (KPG), 10.00 g of SMA base polymer 2 are dissolved under an atmosphere of nitrogen in 109.40 g of 2 Shellsol A. 14.20 g of polymer amine 2 are added and the mixture is stirred for 4 hours at 120° C. Then, 85.20 g of polymer alcohol 1 and 1.09 g of a 10% solution of dibutyl tin dilaurate in xylene is added and the mixture is stirred for further 4 hours at 120° C. A slightly turbid, yellowish liquid of medium viscosity is obtained (50% solution of comb copolymer in Shellsol A).

Copolymer 9:

Under an atmosphere of nitrogen, a round-bottomed flask equipped with a reflux condenser, temperature sensor and precision glass stirrer (KPG) is charged with 100.00 g SMA base polymer 1, 308.00 g of polymer amine 2, 447.20 g of polymer amine 1 solution, 483.00 g of Shellsol A and 3.52 g 2,6-di-tert-butyl-p-cresol and the mixture is heated with stirring to 120° C. The mixture is stirred for further 7 h at 120° C. A clear, yellow liquid of medium viscosity is obtained (53% solution of comb copolymer).

Copolymer 10:

Step a:

Under an atmosphere of nitrogen, a round-bottomed flask equipped with a reflux condenser, temperature sensor and precision glass stirrer (KPG) is charged with 59.1 g of 2,4-diphenyl-4-methyl-1-pentene and 132.6 g of 1-methoxy-2-propyl acetate and the mixture is heated with stirring to 130° C. Then, 3.25 g of 2,2'-azodi-(2-methyl-butyronitrile) in 250.3 g of methyl methacrylate is added within 90 minutes. The mixture is stirred for further 3 h (product: $M_n$=630, $M_w$=2900).

Step b:

Under an atmosphere of nitrogen, a round-bottomed flask equipped with a reflux condenser, temperature sensor and precision glass stirrer (KPG) is charged with 100.00 g of the product of step a), and the mixture is heated with stirring to 130° C. Then, in parallel, 1.) 27.6 g MSA with 1.5 g of 2,2'-azodi-(2-methyl-butyronitrile) in 55.6 g of 1-methoxy-2-propyl acetate and 2.) 29.3 g of styrene is added within 60 minutes. The mixture is stirred for further 5 h (product: $M_n$=1900, $M_w$=5400).

Step c:

50.00 g of the product of step b) are mixed with 155.3 g of polymer amine 1 solution and 56.6 g of 1-methoxy-2-propyl acetate, and the mixture is stirred for 4 h at 120° C. The result is a cloudy, yellow liquid of medium viscosity (50% in 1-methoxy-2-propyl acetate/mineral oil).

Copolymer 11:

Step a:

Under an atmosphere of nitrogen, a round-bottomed flask equipped with a reflux condenser, temperature sensor and precision glass (KPG) is filled with 125.35 g of 1-methoxy-2-propyl acetate and 23.6 g of 2,4-diphenyl-4-methyl-1-pentene and the mixture is heated with stirring to 130° C. Then 68.6 g of MSA dissolved in 100.00 g of 1-methoxy-2-propyl acetate with 4.00 g of di-t-butyl peroxide are added in parallel with 130.54 g of 2-ethylhexyl acrylate within 90 minutes. The mixture is stirred for further 5 h at 130° C. Thereafter, 5 times, every 30 minutes, 1.00 g of the initiator di-t-butyl peroxide is added. A clear, brown liquid of low to medium viscosity is obtained (50% solution; $M_n$=1400, $M_w$=3800).

Step b:

50.0 g of the product of step a) are combined with 160.1 g of Polymer amine 1 solution and 48.1 g of 1-methoxy-2-propyl acetate, and the mixture is stirred for 4 h at 120° C. The result is a clear, brown liquid of medium viscosity (50% in 1-methoxy-2-propyl acetate/mineral oil).

Copolymer 12:
Step a:
Under an atmosphere of nitrogen, a round-bottomed flask equipped with a reflux condenser, temperature sensor and precision glass stirrer (KPG) is filled with 84.2 g of 1-dodecene and 25.5 g of xylene and the mixture is heated with stirring to 140° C. Thereafter, 7 times, every 30 minutes, 7.00 g of MSA in portions, and each time 1 ml of di-tert-butyl peroxide were added in parallel. The mixture is stirred for 3 h at 140° C. Since the resulting product solidifies, 82, 00 g of xylene were added subsequently. A clear, yellow liquid of medium viscosity is obtained (57% solution, $M_n$=2500, $M_w$=7100).
Step b:
25.00 g of the product of step a) are mixed with 109.7 g of POLYMER AMINE 1 SOLUTION and 33.9 g of 1-methoxy-2-propyl acetate and the mixture is stirred for 4 h at 120° C. The result is a clear, brown liquid of medium viscosity (50% in 1-methoxy-2-propyl acetate/mineral oil).

Copolymer 13:
Under an atmosphere of nitrogen, a round-bottomed flask equipped with a reflux condenser, temperature sensor and precision glass stirrer (KPG) is filled with 10.00 g of SMA base polymer 1, 44.7 g of POLYMER AMINE 1 SOLUTION and 54.7 g of Shellsol A and the mixture is heated with stirring to 120° C. The mixture is stirred for further 8 h at 120° C. Thereafter, 1.00 g of ethanolamine are added and the mixture is stirred for further 4 h at 120° C. A clear, yellow liquid of medium viscosity is obtained (34% solution).

Copolymer 14:
Under an atmosphere of nitrogen, a round-bottomed flask equipped with a reflux condenser, temperature sensor and precision glass stirrer (KPG) is charged with 50.00 g of SMA base polymer 1, 154.00 g of polymer amine 2, 223.60 g of polymer amine 1 solution, 241.50 g of Shellsol A and 1.76 g of 2,6-di-tert-butyl-p-cresol and the mixture is heated with stirring to 120° C. The mixture is stirred for further 4 h at 120° C. A clear, yellow liquid of medium viscosity is obtained (53% solution of comb copolymer).

Copolymer 15:
Under an atmosphere of nitrogen, a round-bottomed flask equipped with a reflux condenser, temperature sensor and precision glass stirrer (KPG) is charged with 25.00 g of a 50% solution of SMA base polymer 1 in 1-methoxy-2-propyl acetate, 38.50 g of polymer amine 2, 55.90 g of amine polymer 1 solution, 99.10 g of 1-methoxy-2-propyl acetate, 40.00 g of Shellsol A and 0.44 g of 2,6-di-tert-butyl-p-cresol and the mixture is heated with stirring to 120° C. The mixture is stirred for further 4 h at 120° C. A clear, yellow liquid of low-viscosity is obtained (34% solution of comb copolymer).

Copolymer 16:
Step a:
Under an atmosphere of nitrogen, a round-bottomed flask equipped with a reflux condenser, temperature sensor and precision glass stirrer (KPG) is filled with 50.00 g of SMA base polymer 1, 89.4 g of POLYMER AMIN 1 SOLUTION, 61.7 g of polymer amine 2 and 142.1 g of Shellsol A and the mixture is heated with stirring to 120° C. The mixture is stirred for further 4 h at 120° C. A clear, yellow liquid of medium viscosity is obtained (50% solution).
Step b:
Under an atmosphere of nitrogen, 100.00 g of the product of step a) and 3.1 g of N,N-dimethylaminopropyl amine were stirred for 4 h at 120° C. in a round-bottomed flask equipped with a reflux condenser, temperature sensor and precision glass stirrer (KPG).

Copolymer 17:
Under an atmosphere of nitrogen, 100.00 g of the product of step a) of copolymer 16 and 6.2 g of N,N-dimethylaminopropyl amine were stirred for 4 h at 120° C. in a round-bottomed flask equipped with a reflux condenser, temperature sensor and precision glass stirrer (KPG).

Copolymer 18:
Under an atmosphere of nitrogen, a round-bottomed flask equipped with a reflux condenser, temperature sensor and precision glass stirrer (KPG) was filled with 20.00 g of the product of step b) of copolymer of 16, 0.7 g of benzyl chloride and 6.10 g of 1-methoxy-2-propyl acetate, and the mixture was heated with stirring at 120° C. The mixture is stirred for further 4 h at 120° C. A clear, yellow liquid of medium viscosity is obtained (40% solution).

Copolymer 19:
Under an atmosphere of nitrogen, 20.00 g of the product of step b) of copolymer 16 in 8.50 g of butyl glycol were heated with stirring to 120° C. in a round-bottomed flask equipped with a reflux condenser, temperature sensor and precision glass stirrer (KPG). At 70° C., 0.7 g of benzoic acid are added and upon reaching 120° C., 1.66 g of a C10-C16 alkyl glycidyl ether (Grilonit RV 1814, EMS-Chemie AG) are added. The mixture is stirred for further 6 h at 120° C. A clear, brown liquid of low viscosity is obtained (40% solution).

Copolymer 20:
Under an atmosphere of nitrogen, a round-bottomed flask equipped with a reflux condenser, temperature sensor and precision glass stirrer (KPG) is charged with 25.00 g of a 50% solution of SMA base polymer 1 in 1-methoxy-2-propyl acetate, 41.29 g of polymer amine 3, 55.90 g of polymer amine 1 solution, 99.10 g of 1-methoxy-2-propyl acetate, 40.00 g of Shellsol A and 0.44 g of 2,6-di-tert-butyl-p-cresol and the mixture is heated with stirring to 120° C. The mixture is stirred for further 4 h at 120° C. A clear, yellow liquid of low-viscosity is obtained (34% solution of comb copolymer).

Copolymer 21:
Step a:
Under an atmosphere of nitrogen, a round-bottomed flask equipped with a reflux condenser, temperature sensor and precision glass stirrer (KPG) is charged with 4.72 g of 2,4-diphenyl-4-methyl-1-pentene, 33.34 g of itaconic acid and 100.00 g of 1-methoxy-2-propanol and the mixture is heated with stirring to 130° C. Thereafter, 26.60 g of styrene with 2.36 g of 2,2'-azodi (2-methyl butyronitrile) are added over a period of 60 minutes. Stirring is continued for a total of 5 h at 130° C., during which time 3 times 0.50 g each of the initiator 2,2'-azodi-(2-methyl-butyronitrile) are added. A clear, yellow liquid of low viscosity is obtained (40% solution).
Step b:
Under an atmosphere of nitrogen, 20.00 g of the product of step a) are combined with 32.60 g POLYMER AMIN 1 SOLUTION and 21.75 g of polymer amine 2 in a round-bottomed flask equipped with a reflux condenser, temperature sensor and precision glass stirrer (KPG) and the mixture is heated with stirring for 5 h at 120° C. This is followed by distillation until the reaction mixture has a nonvolatile content of 80% by weight (cloudy yellow liquid of medium viscosity in methoxypropanol/methoxypropyl acetate).

Copolymer 22:
Under an atmosphere of nitrogen, a round-bottomed flask equipped with a reflux condenser, temperature sensor and precision glass stirrer (KPG) is charged with 20.00 g SMA base polymer 3, 78.20 g of polymer amine 2, 117.25 g of polymer amine 1 solution and 113.60 g Shellsol A and the mixture is heated with stirring to 120° C. After 1 hour, 20.00 g of 1-methoxy-2-propyl acetate were added. The mixture is stirred for further 5 h at 120° C. A slightly turbid, yellow liquid of low viscosity is obtained (62% solution).

Copolymer 23:

Step a:

Under an atmosphere of nitrogen, a round-bottomed flask equipped with a reflux condenser, temperature sensor and precision glass stirrer (KPG) is charged with 50.00 g of SMA base polymer 1, 206.00 g of Shellsol A and 148.90 g of polymer amine 1 solution and the mixture is heated with stirring to 120° C. The mixture is stirred for further 8 h at 120° C. A cloudy yellow liquid of medium viscosity is obtained (36% solution of comb copolymer).

Step b:

Under an atmosphere of nitrogen, a round-bottomed flask equipped with a reflux condenser, temperature sensor and precision glass stirrer (KPG) is charged with 50.00 g of the product of step a) and 1.41 g of N,N-dimethylaminopropyl amine, heated to 120° C. and stirred at this temperature for a further 4 h. A clear, yellow liquid of medium viscosity is obtained (38% solution of comb copolymer).

Copolymer 24:

Under an atmosphere of nitrogen, a round-bottomed flask equipped with a reflux condenser, temperature sensor and precision glass stirrer (KPG) is charged with 50.00 g of the product of step a) of copolymer 23 and 2.82 g of N,N-dimethylaminopropyl amine and the mixture is heated to 120° C. The mixture is stirred for 4 hours at this temperature. A clear, yellow liquid of medium viscosity is obtained (38% solution of comb copolymer).

Copolymer 25:

Under an atmosphere of nitrogen, a round-bottomed flask equipped with a reflux condenser, temperature sensor and precision glass stirrer (KPG) is charged with 10.00 g of SMA base polymer 1, 89.40 g of polymer amine 1 solution and 99.40 g Shellsol A and the mixture is heated with stirring to 120° C. The mixture is stirred for further 8 h at 120° C. A clear, yellow liquid of medium viscosity is obtained (34% solution of comb copolymer).

Copolymer 26:

Under an atmosphere of nitrogen, 10.00 g of SMA base polymer 1 are dissolved in 82.76 g Shellsol A in a round-bottomed flask equipped with a reflux condenser, temperature sensor and precision glass stirrer (KPG). 12.33 g of polymer amine 2 are added and the mixture is stirred for 4 hours at 120° C. Thereafter, 49.33 g of polymer alcohol 1 and 1.00 g of a 10% solution of dibutyl tin dilaurate in xylene are added and the mixture is stirred for a further 3 hours at 120° C. Thereafter, another 37.00 g of the polymer amine 1 solution are added and heated again for 3 hours at 120° C. A slightly turbid, yellowish-brown liquid of medium viscosity is obtained (50% solution of comb copolymer).

COMPARATIVE EXAMPLES (NOT INVENTIVE)

Comparative Example 1

Under an atmosphere of nitrogen, a round-bottomed flask equipped with a reflux condenser, temperature sensor and precision glass stirrer (KPG) is charged with 30.00 g of SMA base polymer 1, 98.90 g of polymer amine 4 and 128.90 g Shellsol A and the mixture is heated with stirring to 120° C. The mixture is stirred for further 8 h at 120° C. A clear, yellow liquid of low viscosity is obtained (50% solution).

Comparative Example 2

Under an atmosphere of nitrogen, a round-bottomed flask equipped with a reflux condenser, temperature sensor and precision glass stirrer (KPG) is charged with 30.00 g of SMA base polymer 1, 33.00 g of polymer amine 4 and 63.00 g Shellsol A and the mixture is heated with stirring to 120° C. The mixture is stirred for further 8 h at 120° C. The mixture is then allowed to cool, and at room temperature, 6.80 g of N,N-dimethylaminopropyl amine are added. Now, it is heated again to 120° C. The viscosity increases sharply at first. Stirring is continued for further 6 h at 120° C. A cloudy, yellow substance of high viscosity is obtained (50% solution).

B) Performance Results

TABLE 2

Raw materials used for technical testing

| Name | Description |
|---|---|
| Worleekyd B 6301 | low-viscous, air-drying, long oil alkyd resin (manufacturer: Worlée-Chemie GmbH, Lauenburg) |
| Isopar H | solvent from ExxonMobil Chemical, isoalkanes, C9-C12 |
| Worleethix V 747 | thixotrope long oil alkyd on the basis of specific fatty acids (manufacturer: Worlée-Chemie GmbH, Lauenburg) |
| Calcium 10 | dry material "Octa-Soligen Calcium 10, basic" (10% Ca in white spirit; manufacturer: OMG Borchers GmbH, Langenfeld) |
| Bentone SD 1 | rheology additive for unpolar to medium polar aliphatic and other solvent-based systems (organic derivatives of bentonite clay, manufacturer: Elementis Specialties, Hightstown/NJ, USA) |
| Tronox CR 826 | dense silica/alumina treated rutil pigment for multiple applications, $TiO_2$ content 93% (Tronox, Uerdingen) |
| Dowanol DPM | dipropyleneglycol monomethylether (manufacturer: Dow Chemical Company) |
| Cobalt 12 | Cobalt catalyst/accelerator "Rockwood Durham Cobalt 12" (12% Co in dearomatized hydrocarbon; manufacturer: Rockwood Pigments UK, Durham, UK) |
| Zirkonium 12 | Zirconium catalyst "Rockwood Durham Zirconium 12" (12% Zr in dearomatized hydrocarbon; manufacturer: Rockwood Pigments UK, Durham, UK) |
| Borchi Nox M2 | synthetic organic anti-skinning agent for oil-containing binders (OMG Borchers GmbH, Langenfeld) |
| Shellsol D 40 | aliphatic hydrocarbons, mixture of n-, i- and cyclo-aliphatics, predominantly in the range C9-C11 (manufacturer: Shell Chemicals) |
| Palatal P4-01 | resin system for the production of fiber-enhanced plastics or non-enhanced filled products (manufacturer: DSM Composite Resins, Schaffhausen, Switzerland) |
| Accelerator NL-49P | Cobalt(II)-2-ethyl hexanoate, 1% Co, in an aliphatic ester (manufacturer: Akzo Nobel Polymer Chemicals, Amersfoort, Netherlands) |
| Polyöl 130 | liquid polybutadiene, stereospecific, low-viscous, non-hydrolysable (manufacturer: Evonik Industries, Essen) |
| Styroflex 2G66 | styrene butadiene block-copolymer (Firma BASF, Ludwigshafen) |
| Palapreg P 17-02 | unsaturated polyester resin for the production of fiber-enhanced plastics or non-enhanced filled products, base orthophtalic acid and standard glycols, dissolved in styrene (manufacturer: DSM Composite Resins, Schaffhausen, Switzerland) |
| Palapreg H 850-01 | polymethylmethacrylate, dissolved in styrene (manufacturer: DSM Composite Resins, Schaffhausen, Switzerland) |
| Kraton D 1118 | diblock-copolymer based on styrene and butadiene with a bound styrene proportion of 31% by weight (Kraton Performance Polymers, Houston, USA) |

(I) Use as an Anti-Separation Additive (Compatibilizer)
Test System 1:

In the test system, the separation rate is assessed in a system consisting of the unsaturated polyester resin Palapreg P17-02, and the styrene-butadiene copolymer Styroflex 2G66. For this purpose, Styroflex 2G66 is first partially dissolved in styrene (30% solution). The two components are combined in the following weight ratio:

TABLE 3

Composition of the test system

| Component | Parts by weight |
|---|---|
| Palapreg P17-02 70 | 70 |
| Styroflex 2G66, 30% solution in styrene | 30 (based on the solution) |

100 g of the mixture (ratio of components as indicated in Table 3) are mixed in a 180 ml beaker. In each case, an amount of additive is added which corresponds to a proportion of 1% by weight of the active substance of the additive in the entire system. Thereafter, the mixture is homogenized using a dissolver (type Pendraulik LD 50, toothed disc: 50 mm diameter) first for 30 s at 930 rpm, then for 30 s at 1865 rpm and then transferred into a cylindrical, sealable 100 ml glass vessel (diameter: 3.5 cm, height: 14 cm). Storage conditions are 20° C. in the sealed vessel. After certain periods of time, the mixture is visually checked for incipient phase separation.

TABLE 4

Observation of phase separation

| Additive | after 1 h | after 2 h | after 4 h | after 8 h | after 24 h | after 48 h | after 72 h | after 144 h |
|---|---|---|---|---|---|---|---|---|
| -- (blank) | starting separ. | partial separ. | compl. separ | compl. separ. | compl. separ. | compl. separ. | compl. separ. | compl. separ. |
| Copolymer 2 | no separ. | no separ. | no separ | starting separ. | compl. separ. | compl. separ. | compl. separ. | compl. separ. |
| Copolymer 3 | no separ. | no separ. | no separ | starting separ. | compl. separ. | compl. separ. | compl. separ. | compl. separ. |
| Copolymer 15 | no separ. | no separ. | no separ | no separ. | no separ. | no separ. | no separ. | no separ. |
| Copolymer 4 | no separ. | no separ. | no separ | no separ. | no separ. | no separ. | no separ. | no separ. |

Abbreviations:
separ. = separation;
compl. = complete

From Table 4 it is evident that in the absence of the additive a separation of the two components begins within an hour, while in the presence of the additives this separation was observed visually either significantly later or not at all—within the observation period of 6 days (144 hours).

Test System 2:

In the test system, the separation rate is assessed in a system consisting of the unsaturated polyester resin Palapreg P17-02, and the styrene-butadiene copolymer Kraton D 1118. For this purpose, Kraton D 1118 is first partially dissolved in styrene (30% solution). The two components are combined in the following weight ratio:

TABLE 5

Composition of the test system

| Component | Parts by Weight |
|---|---|
| Palatal P17-02 | 70 |
| Kraton D 1118, 30% solution in styrene | 30 (based on the solution) |

100 g of the mixture (ratio of components as indicated in Table 5) are mixed in a 180 ml beaker. In each case, an amount of additive is added which corresponds to a proportion of 1% by weight of the active substance of the additive in the entire system. Thereafter, the mixture is homogenized using a dissolver (type Pendraulik LD 50, toothed disc: 50 mm diameter) first for 30 s at 930 rpm, then for 30 s at 1865 rpm and then transferred into a cylindrical, sealable 100 ml glass vessel (diameter: 3.5 cm, height: 14 cm). Storage conditions are 20° C. in the sealed vessel. After certain periods of time, the mixture is visually checked for incipient phase separation.

TABLE 6

Observation of phase separation

| Additive | after 30 min | after 2 h | after 19 h | after 24 h | after 48 h | after 67 h |
|---|---|---|---|---|---|---|
| -- (blank) | starting separ. | partial separ. | compl. separ. | compl. separ. | compl. separ. | compl. separ. |

TABLE 6-continued

Observation of phase separation

| Additive | after 30 min | after 2 h | after 19 h | after 24 h | after 48 h | after 67 h |
|---|---|---|---|---|---|---|
| Copolymer 15 | no separ. | no separ. | no separ. | no separ. | no separ. | no separ. |

Abbreviations:
separ. = separation;
compl. = complete

From Table 6 it is evident that in the absence of the additive a separation of the two components begins within an hour, while in the presence of the additive this separation was not observed at all within the observation period of 67 hours.

Test System 3:

In the test system, the separation rate is assessed in a system consisting of the unsaturated polyester resin Palapreg P17-02, and the styrenic polymethylmethacrylate solution Palapreg H850-01. For this purpose, the two components are combined in the following weight ratio:

TABLE 7

Composition of the test system

| Component | Parts by Weight |
| --- | --- |
| Palapreg P17-02 | 70 |
| Palapreg H850-01 | 30 |

100 g of the mixture (ratio of components as indicated in Table 7) are mixed in a 180 ml beaker. In each case, an amount of additive is added which corresponds to a proportion of 1% by weight of the active substance of the additive in the entire system. Thereafter, the mixture is homogenized using a dissolver (type Pendraulik LD 50, toothed disc: 50 mm diameter) first for 30 s at 930 rpm, then for 30 s at 1865 rpm and then transferred into a cylindrical, sealable 100 ml glass vessel (diameter: 3.5 cm, height: 14 cm). Storage conditions are 20° C. in the sealed vessel. After certain periods of time, the mixture is visually checked for incipient phase separation.

TABLE 8

Observation of phase separation

| Additive | after 2 h | after 3 h | after 5 h | after 10 h | after 24 h |
| --- | --- | --- | --- | --- | --- |
| -- (blank) | starting separ. | compl. separ. | compl. separ. | compl. separ. | compl. separ. |
| Copolymer 15 | no separ. | no separ. | no separ. | no separ. | no separ. |
| Copolymer 11 | no separ. | no separ. | no separ. | no separ. | compl. separ. |
| Copolymer 21 | no separ. | no separ. | no separ. | beginnende separ. | compl. separ. |

Abbreviations:
separ. = separation;
compl. = complete

From Table 8 it is evident that in the absence of the additive a separation of the two components begins within three hours, while in the presence of the additives this separation was observed visually either significantly later or not at all—within the observation period of 24 hours.

The examples listed above show that the additives according to the invention can realize their anti-separation effect and liquid-liquid mixtures of different composition.

(II) Use as a Wetting Agent and Dispersant

Compatibility Test

In a preliminary test, the compatibility of the additives is first checked in the respective binder or solvent. For this purpose, the following mixtures are prepared:

Binder Worleekyd B 6301/additive: 95:5 [20 g:1.05 g]

Solvent Isopar H/additive: 95:5 [15 g:0.79 g]

Execution:

The binder (Worleekyd B 6301) and the solvent (Isopar H) are filled into 50 ml snap-cap vials and a certain amount of the particular additive sample is added. Homogenization is performed briefly with a spatula. The turbidity or phase separation is visually assessed the next day.

TABLE 9

Results of the compatibility test

| Additive | in Worleekyd B 6301 | in Isopar H |
| --- | --- | --- |
| Copolymer 9 | clear | turbid |
| Copolymer 25 | clear | clear |
| Copolymer 13 | clear | clear |
| Copolymer 23 | clear | clear |
| Copolymer 24 | clear | slightly milky |
| Copolymer 16 | clear | turbid |
| Copolymer 17 | clear | turbid |
| Copolymer 19 | clear | slightly yellow |
| Comparative Example 1 | turbid | solid sediment, not extractable |
| Comparative Example 2 | foamy, not completely dissolved | not dissolved, material settles at the bottom |

From Table 9 it is evident that the two non-inventive comparative products 1 and 2 are not suitable as a wetting agent and dispersant because of their incompatibility in the system; in the coating formulation experiments it was not possible to incorporate them into the system and assess them.

Coating Formulation

Preparation of Coatings

The components Worleethix V 747, Worleekyd 6301, "Calcium 10", titanium dioxide (Tronox CR 826) and Bentone SD 1 and the additive were weighed, and dispersed for 20 minutes using a dissolver type "Dispermat CV" at 8000 rpm (teflon disc, diameter 4.5 cm). The proportions corresponded to those indicated in the following Table 10a. The additives according to the invention were used in each case in such a way that the amount of the active substance contained in the system was the same (see Table 10b). Thereafter, the components Dowanol DPM, Cobalt 12, Zirconium, Borchi Nox M2 and Shellsol D 40 were added with stirring at 1000 rpm in the amounts indicated in the Table.

TABLE 10a

Composition of the coatings prepared
(all amounts in parts by weight)

| Component | Parts by weight |
| --- | --- |
| Worleethix V 747 | 2.50 |
| Worleekyd 6301 90% | 55.67 |
| Calcium 10 | 0.83 |
| Additive | amount see Table 10b |
| Bentone SD 1 | 0.33 |
| Tronox CR 826 | 21.00 |
| Grinding 20 minutes Dispermat CV 8000 rpm | |
| Dowanol DPM | 1.30 |
| Cobalt 12 | 0.83 |
| Zirconium 12 | 1.70 |
| Borchi Nox M2 | 0.40 |
| Shellsol D 40 | 15.44 |

TABLE 10b

Additive amounts used (parts by weight in proportion to the amounts specified in Table 10a) depending on the content of the active ingredient of products prepared (2% solid on TiO$_2$)

| Copolymer 9 | 0.79 |
| --- | --- |
| Copolymer 25 | 1.24 |
| Copolymer 13 | 1.24 |
| Copolymer 23 | 1.11 |
| Copolymer 24 | 1.11 |

TABLE 10b-continued

Additive amounts used (parts by weight in proportion to the amounts specified in Table 10a) depending on the content of the active ingredient of products prepared (2% solid on TiO$_2$)

| | |
|---|---|
| Copolymer 16 | 0.84 |
| Copolymer 17 | 0.84 |
| Copolymer 19 | 1.05 |

Assessment of the Gloss:

After 1 day and after 3 days of storage at room temperature, the paint was applied on a glass plate using a 150 μm spiral blade. After complete drying, the gloss was measured using a gloss meter type "Micro Tri Gloss" (manufacturer: BYK Gardner, Geretsried) at different angles of 20°/60°/85°. From, inter alia, Table 10c it is apparent that the additives do not have any negative influence on the gloss, while the haze of the coating with respect to the control with no additive is lowered, i.e., improved.

TABLE 10c

Gloss measurement of the applied coatings

| Additives in der coating formulation | Gloss | | | | | | |
|---|---|---|---|---|---|---|---|
| | 20° after 1 day | 60° | 85° | 20° after 3 days | 60° | 85° | Haze |
| Control without wetting agents | 84.4 | 92.2 | 98.7 | 83.0 | 92.0 | 96.4 | 55.0 |
| Copolymer 9 | 86.3 | 92.8 | 98.4 | 85.1 | 92.3 | 98.3 | 31.9 |
| Copolymer 25 | 85.2 | 92.2 | 98.9 | 84.1 | 92.0 | 98.8 | 25.8 |
| Copolymer 13 | 84.9 | 92.2 | 98.9 | 83.4 | 91.9 | 98.4 | 35.3 |
| Copolymer 23 | 84.9 | 92.2 | 98.6 | 81.8 | 91.4 | 98.6 | 36.6 |
| Copolymer 24 | 85.4 | 92.4 | 98.4 | 81.2 | 92.1 | 98.4 | 30.1 |
| Copolymer 16 | 86.0 | 92.9 | 98.8 | 81.9 | 92.7 | 98.6 | 52.1 |
| Copolymer 17 | 86.1 | 93.0 | 98.6 | 84.7 | 92.7 | 98.3 | 38.5 |
| Copolymer 19 | 86.3 | 92.8 | 98.6 | 84.2 | 92.1 | 97.9 | 23.2 |

Viscosity Determination:

Viscosities of the coatings produced are determined after storage for 5 days at room temperature and storage for 14 days at 50° C. The measurement was done using a Brookfield viscometer (Firma Brookfield, Lorch) using the spindle 04 at 5 and at 50 rpm.

TABLE 11

Measured viscosities of the coatings.

| | Viscosities - Brookfield S 04 | | | |
|---|---|---|---|---|
| | 05 rpm | | 50 rpm | |
| Additive in the coating formulation | 5 days rt | 14 days 50° C. | 5 days rt | 14 days 50° C. |
| Control without wetting agent | 800 | 800 | 585 | 820 |
| Copolymer 9 | 560 | 680 | 568 | 740 |
| Copolymer 25 | 790 | 720 | 646 | 672 |
| Copolymer 13 | 720 | 760 | 604 | 672 |
| Copolymer 23 | 600 | 830 | 620 | 704 |
| Copolymer 24 | 640 | 600 | 574 | 640 |
| Copolymer 16 | 560 | 560 | 576 | 616 |
| Copolymer 17 | 560 | 560 | 596 | 612 |
| Copolymer 19 | 600 | 600 | 583 | 664 |

Study of Color Acceptance:

To study the color acceptance of white paints produced a tinting paste was incorporated (Colortrend 807-9957 HS Lamp Black 97:3). The homogenization was performed by shaking for 3 min on a Skandex shaker (Model SK450, Firma GROOTEC Company GmbH, Ichtershausen).

After 1 day of storage at room temperature, the coatings were applied on contrast cards (type BYK-Gardner no. 2853) using a 200 μm spiral blade; after about 30 minutes a rub-out test was performed.

After complete drying, the samples were measured using a "Color Guide Sphere" meter (BYK Gardner, Geretsried) (L/a/b values and ΔE value) and visually assessed.

TABLE 12

Color strength and color stability of the coatings

| | Worleekyd 6301 | | | | | | | | |
|---|---|---|---|---|---|---|---|---|---|
| Color trend | untreated area | | | rub out | | | | color | color strength |
| 807-9957 97:3 | L* | a* | b* | L* | a* | b* | ΔE *[1] | strength | rub out |
| Control without additive | 55.66 | −1.33 | −4.68 | 53.71 | −1.14 | −4.57 | 1.95 | 100% *[2] | 100% *[2] |
| Copolymer 9 | 53.46 | −1.24 | −4.62 | 53.18 | −1.18 | −4.55 | 0.29 | 116% | 104% |
| Copolymer 25 | 54.16 | −1.29 | −4.63 | 52.84 | −1.20 | −4.48 | 1.33 | 111% | 106% |
| Copolymer 13 | 55.32 | −1.33 | −4.65 | 53.96 | −1.22 | −4.51 | 1.37 | 103% | 98% |
| Copolymer 23 | 54.12 | −1.21 | −4.40 | 53.63 | −1.18 | −4.55 | 0.51 | 111% | 100% |
| Copolymer 24 | 54.10 | −1.22 | −4.40 | 53.67 | −1.16 | −4.62 | 0.48 | 111% | 100% |
| Copolymer 16 | 54.08 | −1.30 | −4.76 | 53.49 | −1.17 | −4.65 | 0.60 | 111% | 102% |
| Copolymer 17 | 55.01 | −1.29 | −4.56 | 54.01 | −1.18 | −4.45 | 1.01 | 105% | 97% |
| Copolymer 19 | 54.88 | −1.29 | −4.61 | 53.96 | −1.19 | −4.52 | 0.91 | 106% | 98% |

*[1] between untreated surface/rub out
*[2] values of the blank "Control" (without additive) by definition set to 100%

From Table 12 it is apparent that, compared to the blank sample, by means of the additives according to the invention a significant improvement of the EE-value can be achieved, and secondly, the color strength is positively affected in many cases.

(III) Use as Deaerator Additive

Resin Formulation:

First, the following components are mixed in the proportions indicated and homogenized by stirring:

TABLE 13

| Composition of the test system | |
|---|---|
| Palatal P4-01 | 930 g |
| Styrol | 70 g |
| Accelerator NL-49P | 10 g |

1.00 g Butanox M50 and 0.25 g additive (as supplied) were added to 50 g of the resin thus prepared, and were stirred with a dissolver (type Pendraulik 5HWM, toothed disc: 4.5 cm diameter) for 30 seconds at 4660 rpm. The product obtained is poured onto a PET film. After 30 s, the liquid film formed is covered with a second PET film. After 60 min, square samples having an edge length of 10 cm were cut from the PET/Resin/PET laminate. The curing takes place at 80° C. overnight. The following day, the film is visually assessed (see Table 14).

TABLE 14

| Visual assessment of the ventilation effect | | |
|---|---|---|
| Additive | Visual assessment | Assessment |
| --(blank) | extremely many gas bubbles | failing |
| Copolymer 6 | few gas bubbles, no turbidity | good |
| Copolymer 7 | few gas bubbles, no turbidity | good |

The invention claimed is:

1. A copolymer whose overall structure as such, and/or an optionally present segment A of the overall structure having at least 10 bivalent structural units, contain as bivalent structural units, in each case,
   i) 40-90 mol % of a basic structural unit (I),
   ii) 10-60 mol % of a nonpolar dicarboxylic acid derivative structural unit (II),
   iii) 0-50 mol % of a polar dicarboxylic acid derivative structural unit (III),
   iv) 0-50 mol % of an oxygen group structural unit (IV), and
   v) 0-40 mol % of a head group structural unit (V),
wherein the basic structural unit (I) is produced by reacting a monomer (Ix) containing an olefinic double bond, and does not include any species coming under said structural units (II) to (V),
said nonpolar dicarboxylic acid derivative structural unit (II) is present in accordance with one or more of the formulas from the group consisting of (IIa), (IIb), (IIc), and (IId)

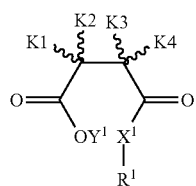
(IIa)

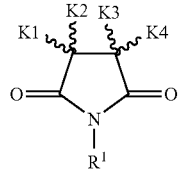
(IIb)

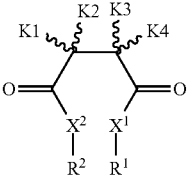
(IIc)

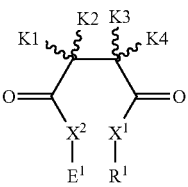
(IId)

wherein

K1, K2, K3 and K4 each are the same or different, and are each represented by connectivity options in the polymer chain with the proviso, that exactly two of said connectivity options are realized per general formula, $X^1$ and $X^2$ are the same or different and each independently are represented by $NR^x$ and/or O
   wherein $R^x$ is the same or different and is represented by H and/or a branched or unbranched $C_1$-$C_{12}$ alkyl radical, $Y^1$ is the same or different and is represented by H, a branched or unbranched $C_1$-$C_{24}$ alkyl radical, a $C_6$-$C_{18}$ aryl radical and/or a branched or unbranched $C_6$-$C_{18}$ arylalkyl radical, $R^1$ and $R^2$ each are the same or different and are each independently represented by a branched or unbranched, saturated or unsaturated hydrocarbon radical having at least 50 carbon atoms, $E^1$ is same or different and is represented by a branched or unbranched organic radical which contains at least four functional groups which are present in the form of ether groups and/or ester groups, said polar dicarboxylic acid derivative structural unit (III) is present in accordance with one or more of the formulas from the group consisting of (IIIa) and (IIIb)

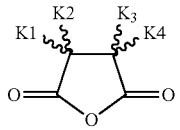
(IIIa)

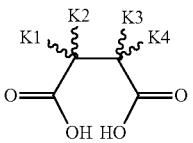
(IIIb)

wherein

K1, K2, K3 and K4 each are the same or different, and are each represented by connectivity options in the polymer chain with the proviso, that exactly two of said connectivity options are realized per general formula, said oxygen group structural unit (IV) does not include any species coming under dicarboxylic acid derivative structural unit (II) and is present in accordance with one or more of the formulas from the group consisting of (IVa), (IVb), (IVc), and (IVd)

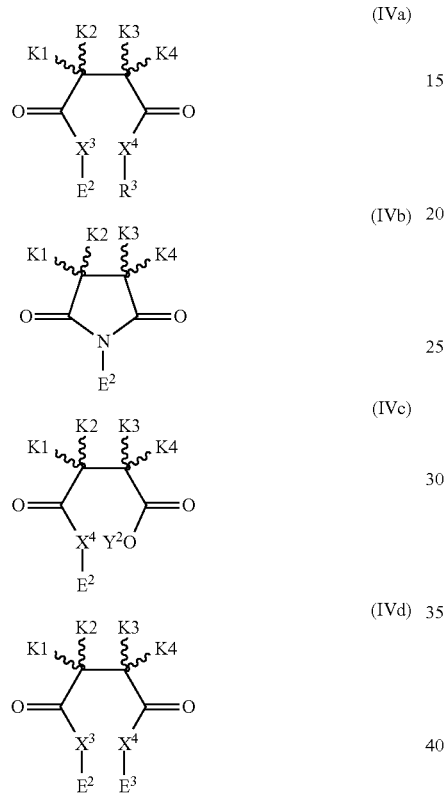

(IVa)

(IVb)

(IVc)

(IVd)

wherein

K1, K2, K3 and K4 each are the same or different, and are each represented by connectivity options in the polymer chain with the proviso, that exactly two of said connectivity options are realized per general formula, $X^3$ and $X^4$ each are the same or different and each independently of one another are represented by $NR^y$ and/or O
  wherein $R^y$ is the same or different and is represented by H and/or a branched or unbranched $C_1$-$C_{12}$ alkyl radical, $Y^2$ is the same or different and is represented by H, a branched or unbranched $C_1$-$C_{24}$ alkyl radical, a $C_6$-$C_{18}$ aryl radical and/or a branched or unbranched $C_6$-$C_{18}$ arylalkyl radical, $R^3$ is the same or different and is represented by a substituted or unsubstituted, branched or unbranched $C_1$-$C_{40}$ alkyl group, by a substituted or unsubstituted, branched or unbranched $C_1$-$C_{40}$ alkenyl group; by a substituted or unsubstituted $C_6$-$C_{18}$ aryl group, a substituted or unsubstituted, branched or unbranched $C_7$-$C_{18}$ arylalkyl group and/or a substituted or unsubstituted $C_4$-$C_{10}$ cycloalkyl group, $E^2$ is same or different and is represented by a branched or unbranched organic radical which contains altogether at least four functional groups which are present in the form of ether groups and/or ester groups, $E^3$ is same or different and is represented by a branched or unbranched organic radical which contains altogether at least four functional groups which are present in the form of ether groups and/or ester groups, and said head group structural unit (V) does not include any species coming under structural units (II) and (IV) and is present in accordance with one or more of the formulas from the group consisting of (Va), (Vb), (Vc), and (Vd)

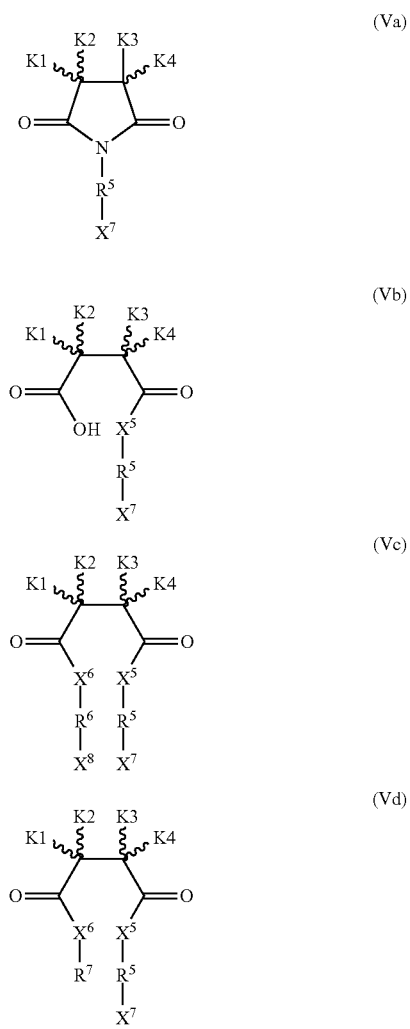

(Va)

(Vb)

(Vc)

(Vd)

wherein

K1, K2, K3 and K4 each are the same or different, and are each represented by connectivity options in the polymer chain with the proviso, that exactly two of said connectivity options are realized per general formula, $X^5$ and $X^6$ each are the same or different and each independently of one another are represented by $NR^z$ and/or O
  wherein $R^z$ is the same or different and is represented by H and/or a branched or unbranched $C_1$-$C_{12}$ alkyl radical, $X^7$ and $X^8$ each are the same or different and each independently from one another is represented by a phosphoric acid ester group, a phosphonic acid ester group, a N,N-disubstituted amino group of the general formula (VA)

(VA)

and/or a quaternary ammonium group of the general formula (VB)

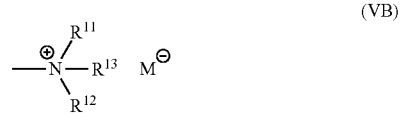

(VB)

wherein $R^{11}$, $R^{12}$ and $R^{13}$ each are the same or different and each independently of one another are represented by a substituted or unsubstituted, branched or unbranched $C_1$-$C_{24}$-alkyl group, by a substituted or unsubstituted $C_4$-$C_{10}$ cycloalkyl group, by a substituted or unsubstituted $C_6$-$C_{18}$ aryl group and/or a substituted or unsubstituted, branched or unbranched $C_7$-$C_{18}$ arylalkyl group, wherein $R^{11}$ and $R^{12}$ together with each other can form a substituted or unsubstituted $C_4$-$C_{10}$ cycloalkyl group, and $M^-$ is the same or different and is represented by a carboxylate, a phosphate, a phosphate ester, a sulfate and/or a halide, $R^5$ and $R^6$ each are the same or different and are each independently of one another are represented by a substituted or unsubstituted, branched or unbranched $C_1$-$C_{24}$ alkylene group and/or a substituted or unsubstituted $C_6$-$C_{18}$ arylene group, $R^7$ is the same or different and is represented by a substituted or unsubstituted, branched or unbranched $C_1$-$C_{40}$ alkyl group, by a substituted or unsubstituted, branched or unbranched $C_1$-$C_{40}$ alkenyl group; by a substituted or unsubstituted $C_6$-$C_{18}$ aryl group, a substituted or unsubstituted, branched or unbranched $C_7$-$C_{18}$ arylalkyl group and/or a substituted or unsubstituted $C_4$-$C_{10}$ cycloalkyl group.

2. The copolymer according to claim 1, characterized in that its overall structure as such, and/or said optionally present segment A contain as bivalent structural units, in each case
 i) 30-75 mol % of said basic structural unit (I),
 ii) 15-55 mol % of said non-polar dicarboxylic acid structural unit (II),
 iii) 0-30 mol-% of said polar dicarboxylic acid structural unit (III),
 iv) 0-35 mol % of the oxygen group structural unit (IV), and
 v) 0-20 mol % of the head group structural group (V).

3. The copolymer according to claim 1, characterized in that said olefinic double bond-containing monomer (Ix) producing said basic structural unit (I) is selected from one or more of the monomers of the group consisting of alkyl (meth)acrylates, alkenyl (meth)acrylates of straight-chain, branched or cycloaliphatic monoalcohols having 1 to 22 carbon atoms, or of straight-chain or branched aromatic or mixed aromatic-aliphatic monoalcohols having 1 to 22 carbon atoms, mono (meth)acrylates of oligomeric or polymeric ethers, (meth)acrylates of halogenated alcohols; oxirane-containing (meth)acrylates, styrene, substituted styrenes, α-olefins, vinyl ethers, allyl ethers; methacrylonitrile, acrylonitrile; vinyl group-containing cycloaliphatic heterocycles having at least one nitrogen atom as a ring member, vinyl esters of monocarboxylic acids having 1 to 20 carbon atoms, N-alkyl and N,N-dialkyl-substituted acrylamides with straight-chain, branched or cycloaliphatic alkyl groups having 1 to 22 carbon atoms, ethylenically unsaturated monomers having at least one carboxylic acid, phosphonic acid, phosphoric acid and/or sulfonic acid group, and unsaturated fatty acids.

4. The copolymer according to claim 1, characterized in that at least 60 mol % of the structural units associated said basic structural unit (I) are produced by reaction of styrene.

5. The copolymer according to claim 1, characterized in that $R^1$ and $R^2$ each are the same or different and are represented each independently by a branched or unbranched alkyl radical and/or a branched or unbranched alkenyl radical, each optionally present in the form of polyolefin radicals, each based on 2-8 carbon atoms-containing olefins.

6. The copolymer according to claim 1, characterized in that $R^1$ and $R^2$ are the same or different and are each independently represented by a polyisobutylene radical and/or a non-hydrogenated, partially hydrogenated and/or fully hydrogenated polybutadiene residue and/or a non-hydrogenated, partially hydrogenated and/or fully hydrogenated polyisoprene radical.

7. The copolymer according to claim 1, characterized in that at least 60 mol % of the radicals present as $R^1$ and/or $R^2$ are represented by a polyisobutylene radical having 50-200 carbon atoms.

8. The copolymer according to claim 1, characterized in that its overall structure as such and/or the optionally present segment A contain 0.1 to 10 mol % of the polar dicarboxylic acid derivative structural unit (III) as bivalent structural units.

9. The copolymer according to claim 1, characterized in that its overall structure as such and/or the optionally present segment A contain 1 to 10 mol % of the oxygen group structural unit (IV) as bivalent structural units.

10. The copolymer according to claim 9, characterized in that $E^2$ and $E^3$ are the same or different and each contains 4-300 ether oxygen atoms.

11. The copolymer according to claim 1, characterized in that its overall structure as such and/or the optionally present segment A contain 1 to 10 mol % of the head group structural unit (V) as bivalent structural units.

12. The copolymer according to claim 1 whose overall structure contains on the one hand said segment A and on the other hand at least one further segment B containing bivalent structural units, wherein said segment A is present as a block A and said segment B is present as a block B bound to block A, which differs from block A in respect to the concentration of the bivalent structural units (I)-(V) and/or in respect to the nature of the bivalent structural units.

13. The copolymer according to claim 1, containing 10-500 structural units which are selected from the group of bivalent structural units (I) to (V).

14. A preparation of a copolymer according to claim 1, characterized in that in a previous step, a copolymer precursor is prepared by polymerization, wherein in a subsequent step the nonpolar dicarboxylic acid derivative structural unit (II) and optionally in each case the oxygen group structural unit (IV) and/or the head group structural group (V) is formed by grafting reactions.

15. The preparation according to claim 14, characterized in that the copolymer precursor has a number average molecular weight of 600-25,000 g/mol.

16. A composition which can be prepared by mixing at least two components, each of which at the mixing temperature is present in liquid form, wherein 0.1-10% by weight, based on the total weight of the composition, of the copolymer according to claim 1 is added as a third component as a compatibilizer.

17. The composition according to claim 16, which is present as an emulsion, containing 0.1 to 10% by weight of the copolymer, 0.1 to 50% by weight of a homopolymer or copolymer of butadiene, and 10 to 70% by weight of an ethylenically unsaturated polymeric resin, which may optionally be dissolved in an ethylenically unsaturated reactive diluent, wherein the proportion of the butadiene structural units in the copolymer of butadiene is optionally at least 33 mol %, and the ethylenically unsaturated polymeric resin is optionally present as unsaturated polyester or unsaturated vinyl ester which in each case optionally are present dissolved in styrene.

18. A dispersion, containing a dispersing medium and dispersed particulate solid, which is optionally present in the form of an inorganic filler, and/or in the form of an inorganic or organic pigment and/or in the form of carbon nanotubes and/or in the form of graphenes, wherein 0.1-10% by weight, based on the total weight of the dispersion, of the copolymer according to claim 1 is added as wetting agent and dispersant.

19. A process comprising utilizing the copolymer according to claim 1 as a compatibilizer, as a deaerator additive or as wetting agent and dispersant.

* * * * *